United States Patent
Ohashi et al.

(10) Patent No.: US 8,018,663 B2
(45) Date of Patent: *Sep. 13, 2011

(54) IMAGE FORMING LENS, CAMERA AND PORTABLE INFORMATION TERMINAL

(75) Inventors: Kazuyasu Ohashi, Funabashi (JP); Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/533,656

(22) Filed: Jul. 31, 2009

(65) Prior Publication Data
US 2010/0027136 A1    Feb. 4, 2010

(30) Foreign Application Priority Data

| Aug. 2, 2008 | (JP) | 2008-200298 |
| Nov. 7, 2008 | (JP) | 2008-287053 |
| Mar. 10, 2009 | (JP) | 2009-056307 |

(51) Int. Cl.
G02B 9/04 (2006.01)
G02B 9/34 (2006.01)
(52) U.S. Cl. ........ 359/793; 359/771
(58) Field of Classification Search ........ 359/754–795
See application file for complete search history.

(56) References Cited

U.S. PATENT DOCUMENTS

| 3,472,576 A * | 10/1969 | Wagner ............... 359/755 |
| 5,153,779 A | 10/1992 | Ohashi |
| 5,398,135 A | 3/1995 | Ohashi |
| 5,576,891 A | 11/1996 | Ohashi |
| 5,581,319 A | 12/1996 | Ohashi |
| 5,617,254 A | 4/1997 | Ohashi |
| 5,630,188 A | 5/1997 | Ohashi |
| 5,687,401 A | 11/1997 | Kawamura et al. |
| 5,781,349 A * | 7/1998 | Sugawara ............... 359/691 |
| 5,886,835 A * | 3/1999 | Suzuki et al. ........... 359/782 |
| 5,930,056 A | 7/1999 | Ohashi |
| 5,946,144 A | 8/1999 | Yamamoto |

(Continued)

FOREIGN PATENT DOCUMENTS
EP       1734393       12/2006
(Continued)

OTHER PUBLICATIONS
Schott: "Optisches Glas passage", Jan. 1, 1981, p. 1.
(Continued)

Primary Examiner — Darryl J Collins
(74) Attorney, Agent, or Firm — Dickstein Shapiro LLP

(57) ABSTRACT

An image forming lens includes: a first optical system positioned in an object side, a second optical system positioned in an image side, and an aperture stop interposed between the first optical system and the second optical system, wherein the first lens system includes a first F lens group which is positioned in the object side and has at least two negative lenses, and a first R lens group which is positioned in the aperture stop side and has at least one lens, wherein a distance between the first F lens group and the first R lens group is set to be largest, and wherein the second optical system includes a second F lens group in which, in the order from the aperture stop side, a first positive lens, a first negative lens, a second negative lens, and a second positive lens are arranged, and a second R lens group positioned in the aperture stop side and having at least one positive lens.

18 Claims, 10 Drawing Sheets

U.S. PATENT DOCUMENTS

| | | |
|---|---|---|
| 6,275,343 B1 | 8/2001 | Takamoto et al. |
| 6,353,506 B1 | 3/2002 | Ohashi |
| 6,525,885 B2 | 2/2003 | Ohashi |
| 6,639,653 B2 * | 10/2003 | Nagahama et al. ............. 355/67 |
| 6,747,815 B2 * | 6/2004 | Takatsuki ...................... 359/749 |
| 6,747,818 B2 | 6/2004 | Ohashi et al. |
| 6,771,433 B2 | 8/2004 | Ohashi |
| 6,829,102 B2 | 12/2004 | Ohashi et al. |
| 6,839,183 B2 | 1/2005 | Ohashi |
| 6,839,185 B2 | 1/2005 | Ohashi |
| 6,995,921 B2 | 2/2006 | Ohashi |
| 7,038,858 B2 | 5/2006 | Ohashi |
| 7,095,564 B2 | 8/2006 | Ohashi |
| 7,151,638 B2 | 12/2006 | Ohashi |
| 7,164,542 B2 | 1/2007 | Ohashi |
| 7,167,320 B2 | 1/2007 | Ohashi |
| 7,304,803 B2 | 12/2007 | Ohashi |
| 7,372,636 B2 | 5/2008 | Sudoh |
| 7,379,249 B2 | 5/2008 | Ohashi |
| 7,420,745 B2 | 9/2008 | Ohashi |
| 7,535,650 B2 | 5/2009 | Ohashi |
| 7,535,653 B2 | 5/2009 | Sudoh |
| 7,535,654 B2 | 5/2009 | Ohashi |
| 7,554,746 B2 | 6/2009 | Ohashi |
| 7,557,839 B2 | 7/2009 | Ohashi |
| 7,623,304 B2 * | 11/2009 | Kawakami et al. ........... 359/744 |
| 2003/0117716 A1 | 6/2003 | Sekita |
| 2007/0268598 A1 | 11/2007 | Kang et al. |
| 2008/0106799 A1 | 5/2008 | Ohashi |
| 2008/0204894 A1 | 8/2008 | Ohashi |
| 2008/0278779 A1 | 11/2008 | Nishina et al. |
| 2009/0067060 A1 | 3/2009 | Sudoh |
| 2009/0080088 A1 | 3/2009 | Ohashi |
| 2009/0091841 A1 | 4/2009 | Ohashi |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0244720 A1 * | 10/2009 | Yamaguchi ................... 359/690 |
| 2010/0296180 A1 * | 11/2010 | Sudoh et al. .................. 359/793 |

FOREIGN PATENT DOCUMENTS

| | | |
|---|---|---|
| JP | 6-308385 | 11/1994 |
| JP | 2596800 | 1/1997 |
| JP | 09-189858 | 7/1997 |
| JP | 9-189858 A | 7/1997 |
| JP | 9-218350 | 8/1997 |
| JP | 2001-66503 | 3/2001 |
| JP | 3368138 | 11/2002 |
| JP | 3466385 | 8/2003 |
| JP | 3491578 | 11/2003 |
| JP | 2006-349920 | 12/2006 |

OTHER PUBLICATIONS

European Search Report, Oct. 29, 2009.

* cited by examiner

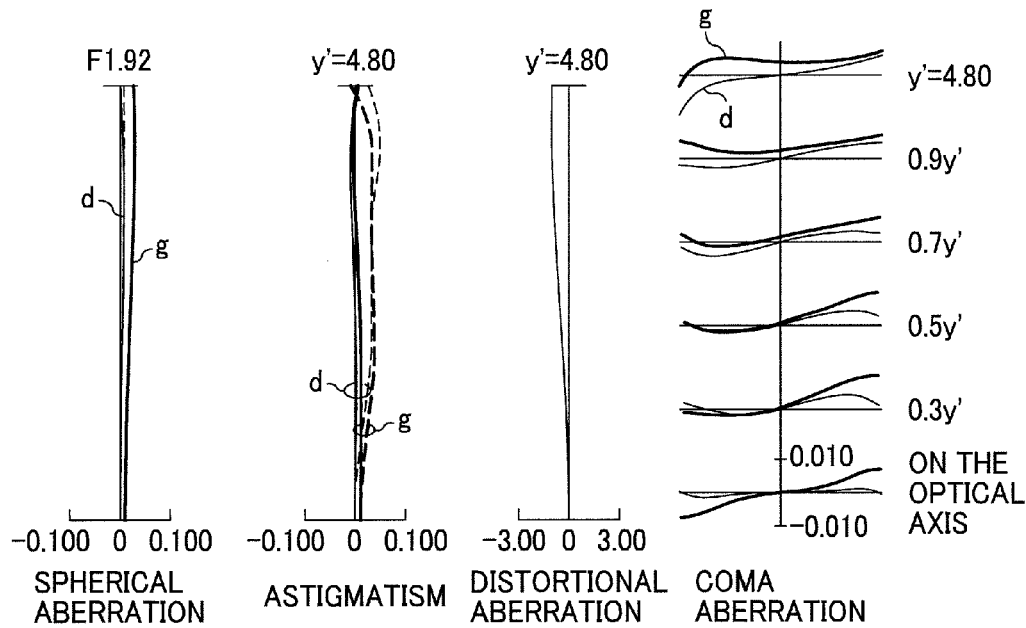
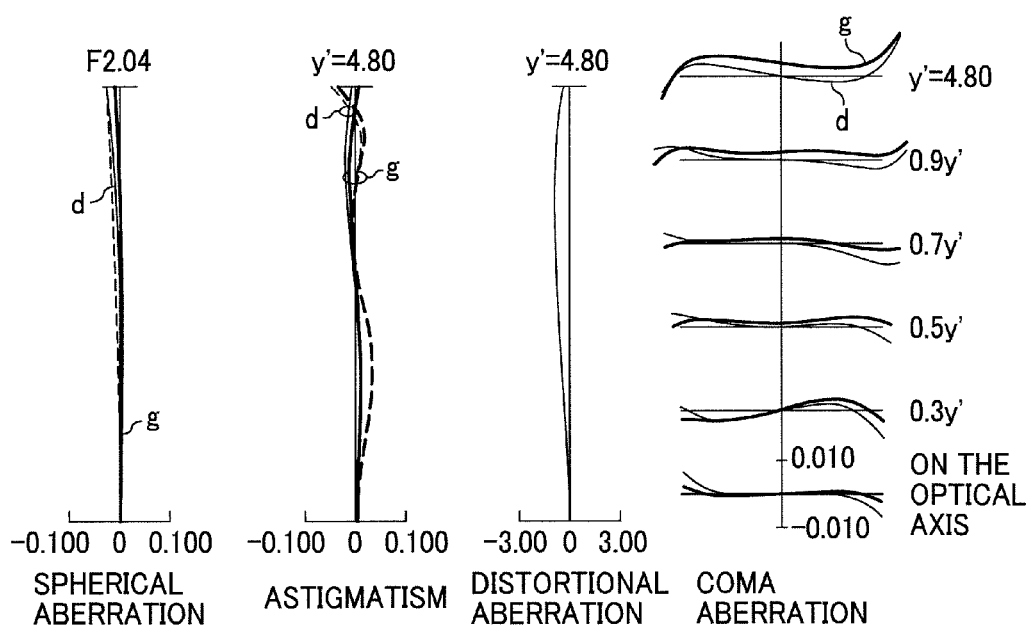

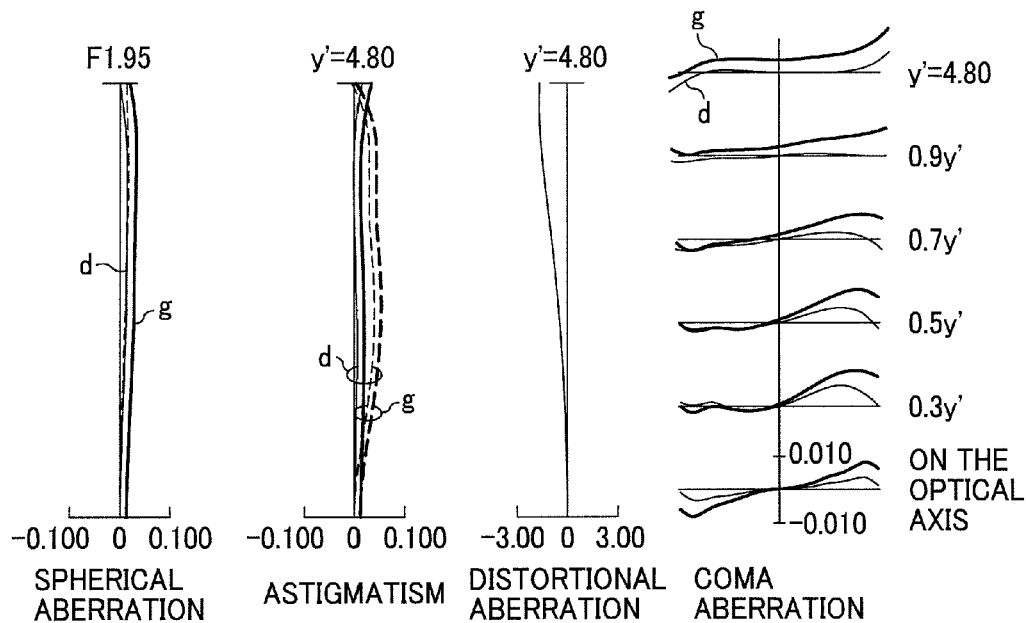
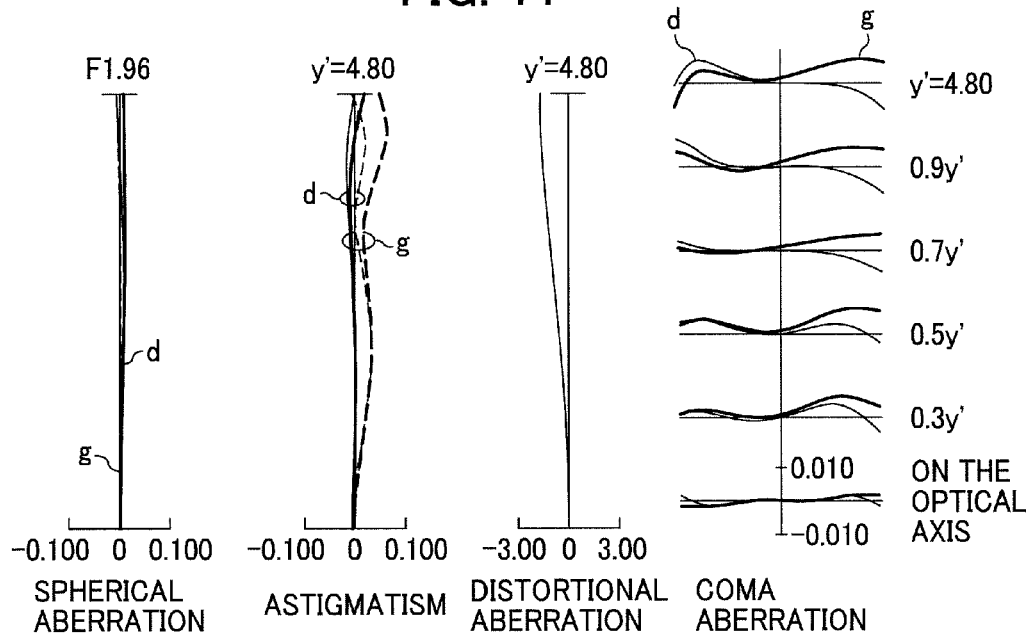

IMAGE FORMING LENS, CAMERA AND PORTABLE INFORMATION TERMINAL

CROSS REFERENCE TO RELATED APPLICATIONS

The present application is based on and claims priority from Japanese Application Numbers No. 2008-200298, filed on Aug. 2, 2008, No. 2008-287053filed on Nov. 7, 2008, and No. 2009-056307, filed on Mar. 10, 2009, the disclosure of which is hereby incorporated by reference herein in its entirety.

BACKGROUND OF THE INVENTION

1. Field of the Invention

The present invention relates to an improvement of an image forming lens having a single focal length, employed as an optical system for photographing in various types of cameras including a so-called silver salt camera, in particular, cameras such as a digital camera, a video camera and so on, and more specifically also relates to an image forming lens suitable for the digital camera, video camera and so on, as well as a camera and a portable information terminal using such the image forming lens.

2. Description of the Related Art

A camera of a type which images a image of an object to be photographed with a solid-state image pick-up device such as a CCD (Charge-Coupled Device) image pick-up device or the like, acquires image data(still image) or a motion image (movie image) of the photographic object, and digitally stores the acquired image data into a nonvolatile semiconductor memory or the like represented by a flash memory, typically referred to as a digital camera or an electronic camera etc., has been generalized in recent years.

A market for such a digital camera has been a very large one, and the user's demands for the digital camera have been ranged in scope. Among others, the digital camera having a zooming function has been popular, a category of "a compact camera of small and high image quality on which an image forming lens having a high performance and a single focus optical system is mounted" has been gained a constant support from the user. As the user's demand, in addition to the camera having a high performance, a F value (number) (hereinafter, referred to "F") is small, that is to say, the weight that the optical system has a large diameter has been become higher.

A market for such a digital camera has been a very large one, and the user's demands for the digital camera have been high and ranged in scope. More specifically, from the viewpoint of the aspect of "high performance" in the compact camera, in addition to, it has at least a resolution for the image pick-up device having from one thousand to two thousands pixels.

"From the opening of a diaphragm aperture, there are little Coma flares and thus the lens has a high contrast while there are no point image collapse up to the periphery of the field angle of view", "There are few chromatic aberration and there are no colors even in a portion where large brightness differences exist", and "Distortional aberration is small and that it is possible to give a vivid description of a line" and the like are required.

Further, in the aspect of "a large diameter", from the standpoint from patentably differentiating from a general compact camera which mounts a zooming lens, it is required to be at least less than F=2.4, further, it is desired to be less than F=2.0 to no small extent With regard to "field angle of view of a photographing lens", since there are many users who wish to desire a wide angle to a certain extent, it is desirable to make the field angle of view of the image forming lens more than 38 degrees (which corresponds to a focal length of 28 mm which is converted to a 35 mm silver salt camera or the so-called Leica version).

Although there considered a variety of image forming lens for digital cameras, as a typical arrangement of a wide angular single focal length lens, there exists a so-called retrofocus type lens system having a first lens group with negative power which is positioned in the object side and a second lens group with positive power which is positioned in the image side.

Based upon the property of an area sensor which has color filter(s) or micro lens(s) every pixel, there exists that the position of the exit pupil is away from an image surface and thus the peripheral luminous flux is incident at an angle substantially perpendicular to a light-receiving surface of the area sensor. This is why the retrofocus type lens system is employed.

However, since the retrofocus type lens in which cardinal points are positioned behind the lens system has a large asymmetric refractive power.

Among such prior art retrofocus type image forming lenses, as the image forming lens having a relatively large diameter and field angle of view of about 38degrees, each of JP-H06-308385-A, JP-A-H09-218350, and JP-2006-349920-A discloses such the image forming lens.

However, although an image forming lens disclosed in JP-H06-308385-A has a large aperture of F=1.4, there are large astigmatism or field curvature and it is difficult to say to have "a sufficient performance up to the periphery".

An image forming lens disclosed in JP-H09-218350-A is inferior to the recent requirement level as being F=2.8 in enlarging a diameter and thus astigmatism, field curvature and chromatic aberration of magnification are large, so it is not difficult to say that they are not sufficiently corrected and controlled.

Accordingly, it goes without saying that this image forming lens has a "sufficient performance up to the peripheral portion".

Furthermore, distortional aberrations of both exceed 2% in the absolute value and thus not satisfactory in this respect.

Further, JP-2006-349920-A discloses an image forming lens in which astigmatism, field curvature, and distortional aberration are sufficiently corrected and controlled but color difference of coma aberration, which is not shown throughout the specification is large.

Further, an Example in which an F value (number) is small, is not sufficient in miniaturization, and thus further improvements are necessary.

SUMMARY OF THE INVENTION

An object of the present invention is to provide image forming lens having a high performation, a wide half angle of view, an large aperture, a relative compactness, sufficiently corrected and controlled aberrations, high resolving power, high contrast, no necessary color attachment, and provision of a vivid depiction of a straight line as a straight line without distortion.

To accomplish the above object, an image forming lens according to one embodiment of the present invention includes a first optical system positioned in an object side, a second optical system positioned in an image side, and an aperture stop interposed between the first optical system and the second optical system.

The first optical system includes a first F lens group which is positioned in the object side and has at least two negative lenses (El, E2), and a first R lens group (GR1) which is positioned in the aperture stop side and has at least one positive lens (E3).

A distance between the first F lens group (GF1) and the first R lens group (GR1) is set to be largest in the first optical system. The second optical system (G2) includes a second F lens group (GF2) in which, in the order from the aperture stop side, a first positive lens (E4), a first negative lens (E5), a second negative lens (E6), and a second positive lens (E7) are arranged, and a second R lens group (GR2) positioned in the image side and having at least one lens (E8).

BRIEF DESCRIPTION OF THE DRAWINGS

These and other features, aspects, and advantages of the present invention will become better understood with regard to the following description, appended claims, and accompanying drawings.

FIG. 8 is an aberration curve of an image forming lens of Numerical Example 1 according to the present invention, FIG. 9 is an aberration curve of an image forming lens of Numerical Example 2 according to the present invention, FIG. 10 is an aberration curve of an image forming lens of Numerical Example 3 according to the present invention, FIG. 11 is an aberration curve of an image forming lens of Numerical Example 4 according to the present invention.

DETAILED DESCRIPTION OF THE PREFERRED EMBODIMENTS

Preferred Embodiments of the present invention will be explained in detail hereinafter with reference to the accompanying drawings.

Figure 1:
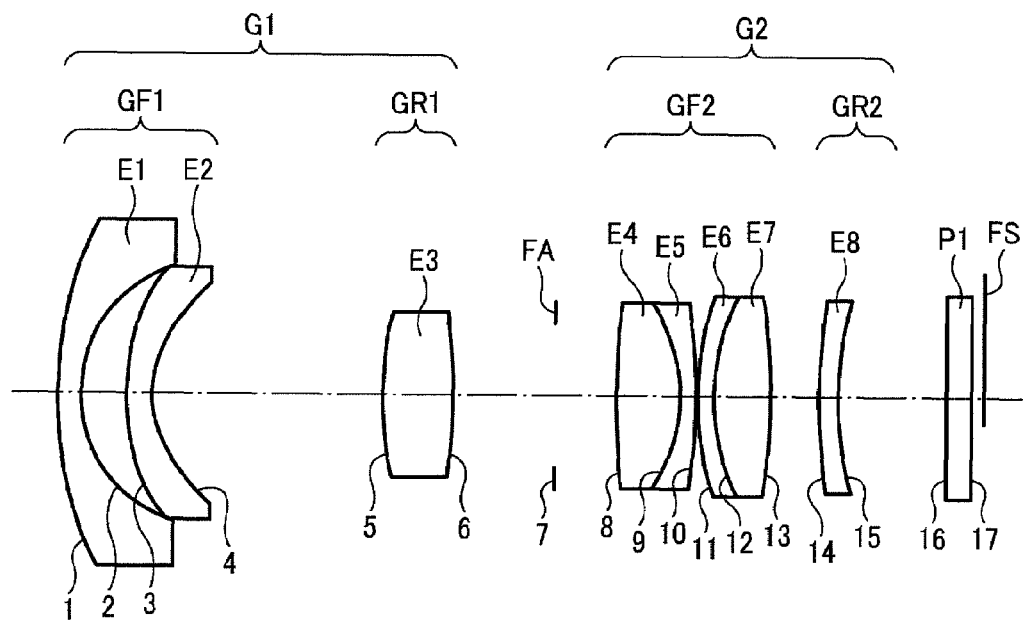
FIG. 1 is a sectional view illustrating an arrangement of an image forming lens of Numerical Example 1 according to the present invention.

FIG. 1 illustrates an embodiment of an image forming lens according to the present invention.

The image forming lens includes a first optical system (G1) positioned in an object side, a second optical system (G2) positioned in an image side, and an aperture stop (FA) interposed between the first optical system (G1) and the second optical system (G2). The first lens system (G1) includes a first F lens group (GF1) which is positioned in the object side and has at least two negative lenses (El, E2), and a first R lens group (GR1) which is positioned in the aperture stop side and has at least one positive lens (E3).

A distance between the first F lens group (GF1) and the first R lens group (GR1) is set to be largest in the first optical system. The second optical system (G2) includes a second F lens group (GF2) in which, in the order from the aperture stop side, a first positive lens (E4), a first negative lens (E5), a second negative lens (E6), and a second positive lens (E7) are arranged, and a second R lens group (GR2) positioned in the image side and having at least one lens (E8).

It is considered that the first lens group (G1) has an aspect that it plays a role as a so-called wide converter attached to the second lens group (G2).

Meanwhile, since the first R lens group (GR1) of the first lens group (G1) and the second F lens group (GF2) of the second lens group (G2) are opposed with respect to the aperture stop, it is possible to well control comatic aberration by keeping balance of positive refractive powers of these lens groups (GR1) and (GF2).

Meanwhile, the first F lens group (GF1) includes an arrangement in which, from the object side, a negative refractive power (the first F lens group (GF1)) and a positive refractive power (the first R lens group (GR1)) are disposed in order. Thus, it is possible to achieve a good balance of securing a sufficient field angle of view and correcting various type aberrations such as a spherical aberration by relatively leaving a space interval between the first F lens group (GF1) and the first R lens group (GR1).

The image forming lens according to the present invention is characterized by the arrangement and its role of the second F lens group (GF2).

In the image forming lens according to the present invention, the second F lens group (GF2) plays a main image forming function and thus is a most important lens group.

The second F lens group (GF2) in the object side is based upon the arrangement of a so-called positive-negative-positive three lenses type triplet but is formed to an arrangement of positive-negative-negative-positive four lenses arrangement by dividing a center negative refractive power into two parts.

The second F lens group (GF2) in an image forming lens of the first embodiment according to the present invention plays a main image forming function and thus is a most important lens group.

The second forward lens group (GF2) is based upon the arrangement of so-called positive-negative-positive type triplet lenses but is formed to an arrangement of positive-negative-negative-positive type four lenses by dividing a center negative refractive power into two parts.

Since the aperture stop is arranged in the object side of the second F lens group (GF2), the off-optical axis light is different in height between a pair of first positive lens and first negative lens and a pair of second negative lens and second positive lens and thus it is possible to effectively reduce both longitudinal chromatic aberration and chromatic aberration of magnification. Further, it is possible to increase a designing degree of freedom and thus reduce color difference of comatic aberration by forming the second negative lens as a designing parameter.

In each lens surface of the second F lens group (GF2), various type aberrations are considerably adjusted in order to reduce the final amount of aberration and thus a manufacture error sensitivity is liable to become high.

The substantial manufacture error is reduced and thus a stable performance is easy to obtain by forming the pair of the first positive lens and the first negative lens as a cemented lens and also forming the pair of the second negative lens and the second positive lens as a cemented lens.

Meanwhile, this leads to reducing the number of parts of a lens barrel which actually holds a lens or lenses.

According to the arrangement of the image forming lens of the present invention, it is possible to obtain advantageous effects upon correcting and controlling aberrations and achieve an extremely high image performance under a severe condition of a wide half angle of view of 38 degrees or so or an large aperture not more than F value (number) of 2.0 or so.

In the image forming lens according to the present invention, the second F lens group (GF2) in the object side satisfies the following conditional equation.

$$0.10 < L_{2F}/L < 0.25$$

where L2F is an entire length of the second F lens group (GF2), and L is a distance from the most object side surface of the image forming lens to the image forming surface.

As a function unit in order to effectively reduce both longitudinal chromatic aberration and chromatic aberration of magnification, utilizing that the height of off-axis light between the pair of the first positive lens and first negative lens and the pair of the second negative lens and second positive lens is different, has already described.

The conditional equation is such that the entire length of the second F lens group (GF2) in order to effectively function its mechanism is limited.

If the parameter of $L_{2F}/L$ is smaller than 0.1, since the differences in height of the off-axis fight within the second F lens group (GF2) becomes small and the above mentioned function is difficult to work normally to thereby insufficiently correct and control chromatic aberrations.

If the parameter of $L_{2F}/L$ in the condition (4) of the fourth embodiment according to the present invention is larger than 0.25, since the second forward lens group (GF2) unnecessarily occupies the space, the relationship with the other lens group is broken to thereby balance curvature of field, astigmatism and comatic aberration.

Meanwhile, the parameter of $L_{2F}/L$ preferably satisfies the following condition in order for sufficiently correcting and controlling aberration.

As the arrangement of the refractive power of the entire image forming lens, the following conditional equation is satisfied.

$$0.1 < L_{2F}/L < 0.2$$

In the second lens group (G2) in the object side, it is preferable that the first positive lens and the first negative lens, and the second negative lens and the second positive lens are cemented, respectively.

In each lens surface of the second forward lens group (GF2), various type aberrations are considerably adjusted in order to reduce the final amount of aberration and thus a manufacture error sensitivity is liable to become high.

The substantial manufacture error is reduced and thus a stable performance is easy to obtain by forming the pair of the first positive lens and the first negative lens as a cemented lens and also forming the pair of the second negative lens and the second positive lens as a cemented lens.

Meanwhile, this leads to reducing the number of parts of a lens barrel which actually holds a lens or lenses.

In the second lens group (G2) in the object side, if the first positive lens and the first negative lens are cemented, a cemented surface of the first positive lens and the first negative lens of the second F lens group (GF2) is convex in an image side, and a cemented surface of the second negative lens (E6) and the second positive lens (E7) is convex in the object side.

With this arrangement, the cemented convex surface in the image side mainly plays a role in correcting longitudinal chromatic aberration and the cemented convex surface in the object side mainly plays a role in correcting chromatic aberration of magnification, thereby effectively performing the correction of the entire chromatic aberration $$0.0 < f_A/f_1 < 0.8$$

where $f_A$ is a focal length of the entire optical system, and $f_1$ is a focal length of the first optical system (G1).

In the image forming lens of the present invention, although it has described that the first lens group (G1) is considered to play a role of a wide converter attached to a so-called the second lens group (G2), if the actual correction of aberration is performed, it is not best that the first lens group is completely a afocal system.

If $f_A/f_1$ is 0.0 or less, the refractive power of the second lens group (G2) must be strengthen, so that a curvature of the image surface becomes large or negative distortional aberration considerably occurs, which is not preferable.

Spherical aberration is difficult to sufficiently correct and control. On the other hand, if $A_{1F-1R}/L_1$ is larger than 0.7, spherical aberration is liable to be exceedingly corrected and controlled, both of which are not preferable.

On the other hand, if $f_A/f_1$ is not less than 0.8, since the contribution of the second lens group (G2) to the image formation becomes smaller, the theory in order to correct and control aberration which has described so far is difficult to be established or a relatively large aberration occurs in the first lens group (G1), a manufacture error sensitivity becomes large than needed, which is not preferable.

Meanwhile, in order to sufficiently correct and control aberrations, following conditional equation is satisfied.

$$0.0 < f_A/f_1 < 0.7$$

The first lens group (G1) satisfies the following conditional equation.

$$0.35 < A_{1F-1R}/L_1 < 0.7$$

where $A_{1F-1R}$ is an interval between the first F lens group (GF1) and the first R lens group (GR1), and $L_1$ is the entire length of the first optical system (G1).

It is preferable to appropriately set an interval between the first F lens group (GF1) and the first R lens group (GR1). If $A_{1F-1R}/L_1$ is smaller than 0.35, spherical aberration is difficult to sufficiently correct and control. On the other hand, if $A_{1F-1R}/L_1$ is larger than 0.7, spherical aberration is liable to be exceedingly corrected and controlled, both of which are not preferable.

Since the first rear lens group (GR1) of the first lens group (G1) and the second forward lens group (GF2) of the second lens group (G2) are opposed with respect to the aperture stop, it is possible to well control comatic aberration by keeping balance of positive refractive powers of these lens groups (GR1, GF2).

The structure and its role of the second forward lens group (GF2) characterizes the image forming lens to a great extent.

The second forward lens group (GF2) in an image forming lens of the first embodiment according to the present invention plays a main image forming function and thus is a most important lens group.

The second forward lens group (GF2) is based upon the arrangement of so-called positive-negative-positive type triplet lenses but is formed to an arrangement of positive-negative-negative-positive type four lenses by dividing a center negative refractive power into two parts.

Since the aperture stop is arranged in the object side of the second forward lens group (GF2), the light outside the optical axis is different in height between a pair of first positive lens and first negative lens and a pair of second negative lens and second positive lens and thus it is possible to effectively reduce both longitudinal chromatic aberration and chromatic aberration of magnification.

Further, it is possible to increase designing degree of freedom and thus reduce color difference of comatic aberration by forming the second negative lens as a designing parameter.

In each lens surface of the second forward lens group (GF2), various type aberrations are considerably adjusted in order to reduce the final amount of aberration and thus a manufacture error sensitivity is liable to become high.

The second rear lens group (GR2) plays a role in balancing aberrations and controlling an exit pupil distance.

Meanwhile, this leads to reducing the number of parts of a lens barrel which actually holds a lens or lenses.

Further, according to the seventh embodiment of the present invention, as shown in the conditions (1) and (2), a cemented surface of the first positive lens and the first negative lens is convex in the image side and the second negative lens and the second positive lens is concave in the object side.

With this arrangement, the cemented convex surface in the image side mainly plays a role in correcting longitudinal chromatic aberration and the cemented concave surface in the object side mainly plays a role in correcting chromatic aberration of magnification, thereby effectively performing the correction of the entire chromatic aberration.

The conditions (1) and (2) are such that chromatic aberration is sufficiently corrected in a well balanced manner while monochromatic aberration is sufficiently suppressed to be low.

If the parameter of $r_{S1}/f_A$ the condition (1) is smaller than a lower limit of −2.4 or the parameter of $r_{S2}/f_A$ in the condition (2) is larger than an upper limit of 2.6, since spherical aberration is not sufficiently corrected or implicit comatic aberration still exists when chromatic aberration is preferentially corrected, it is not preferred.

If the parameter of $r_{S1}/f_A$ in the condition (1) is smaller than −0.8 and t the parameter of $r_{S2}/f_A$ in the condition (2) is larger than 1.0, since spherical aberration is exceedingly corrected or explicit comatic aberration still exists when chromatic aberration is preferentially corrected, it is not preferred.

The second rear lens group (G2R) plays a role in balancing aberrations and controlling an exit pupil distance.

Although it goes without saying that having a positive refractive power effectively secures the exit pupil distance, if the exit pupil distance may be short, it may be contribute to the reduction of the entire length of the lens due to having a negative refractive power.

It is natural that the image forming lens according to the present invention generally has a positive refractive power. The second lens group (G2) has a positive refractive power as shown in the second embodiment according to the present invention.

The refractive power in the image forming lens of the second embodiment according to the present invention may be positive or negative.

If the refractive power of the first lens group (G1) is negative, the image forming lens in the second embodiment according to the present invention becomes a retrofocus type.

However, the refractive power of the first lens group becomes large to some extent, the disadvantages of the above-mentioned retrofocus type that the asymmetry of the refractive power arrangement becomes large and thus comatic aberration, distortional aberration, or chromatic aberration of magnification or the like are likely to be not sufficiently corrected and controlled, is liable to appear.

From this point view, it is preferred that the refractive power of the first lens group satisfies the condition (3).

The first lens group (G1) has an aspect that it is a wide converter attached to the second lens group (G2) and thus from the viewpoint of wide converter like function, it is preferable that the first lens group is an afocal lens system. However, the image forming lens according to the present invention does not aim only to widen an angle but aims a realization of high performance. From the standpoint of correcting actual aberrations, it is not best that the first lens group is an afocal lens system.

If the parameter of $f_A/f_1$ in the condition (3) of the eighth embodiment according to the present invention is smaller than 0.0, since the refractive power of the first lens group (G1) becomes negative and thus the positive refractive power of the second lens group (G2) must be increased, the curvature of the image surface becomes large or negative distortional aberration is liable to occur to a great extent.

If the parameter of $f_A/f_1$ in the condition (3) of the eighth embodiment according to the present invention is larger than 0.8, since the contribution to the second lens group (G2) becomes smaller and thus a relatively large aberration is liable to occur in the first lens group (G1). Further, the manufacture error sensitivity is liable to become higher than that as needed.

Further, the parameter of $f_A/f_1$ in the condition (3) of the eighth embodiment according to the present invention, which limits the refractive power of the first lens group (G1), preferably satisfies the following conditions (3A) which is narrower that that of the condition (3), more preferably satisfies the following conditions (3B).

According to the fourth embodiment according to the present invention, the condition (4) is an effective condition to reduce both longitudinal chromatic aberration and chromatic aberration of magnification.

As mentioned above, since the aperture stop is arranged in the object side of the second forward lens group (GF2), the light outside the optical axis is different in height between the pair of the first positive lens and first negative lens and the pair of the second negative lens and second positive lens and thus it is possible to effectively reduce both longitudinal chromatic aberration and chromatic aberration of magnification. The condition (4) limits the entire length of the second forward lens group (GF2) as a condition under which such a function works in a best manner.

If the parameter of $L_{2F}/L$ in the condition (4) of the fourth embodiment according to the present invention is smaller than 0.1, since the differences in height of the off-axis light within the second forward lens group (GF2) becomes small and the above-mentioned function is difficult to work normally to thereby sufficiently correct and control chromatic aberrations.

If the parameter of $L_{2F}/L$ in the condition (4) of the fourth embodiment according to the present invention is larger than 0.25, since the second forward lens group (GF2) unnecessary occupies the space, the relationship with the other lens group is broken to thereby balance curvature of field, astigmatism and comatic aberration.

The parameter of $L_{2F}/L$ in the condition (4) of the fourth embodiment according to the present invention preferably satisfies the following conditions (4A) in order for sufficiently correcting and controlling aberrations.

According to the ninth embodiment according to the present invention, the condition (5) is an effective condition to further sufficiently correcting and controlling aberrations.

It is preferable to appropriately set an interval between the first forward lens group (GF1) and the first rear lens group (GR1). If the parameter of $A_{1F-1R}/L_1$ in the condition (5) of the ninth embodiment according to the present invention is smaller than 0.35, spherical aberration is difficult to sufficiently correct and control. On the contrary, if the parameter of $A_{1F-1R}/L_1$ in the condition (5) of the ninth embodiment according to the present invention is larger than 0.7, spherical aberration is liable to be exceedingly corrected and controlled.

The secondary spectrum of chromatic aberration is effectively reduced to thereby realize a better condition for sufficiently correcting and controlling aberrations by a so-called special low dispersion glass which satisfies the conditions (6) and (7) in the image forming lens of the tenth embodiment according to the present invention.

According to the eleventh embodiment according to the present invention, aberrations are further sufficiently corrected and controlled.

Astigmatism and the like are further sufficiently corrected and controlled by dividing the negative refractive power of the first forward lens group (GF1) into two meniscus lens and thus preventing the occurrence of excessive aberration at a specified surface.

Distortional aberration is considerably corrected and controlled by forming an image side surface having a large curvature to an aspheric surface. Further, this also enables to have a role in correcting comatic aberration and the like.

According to the fifth embodiment according to the present invention, The second forward lens group (GF2) has a sufficient degree of freedom upon correcting aberrations. The second rear lens group (GR2) contributes to realize a relatively compactness.

It is possible to mainly sufficiently correct and control comatic aberration by forming an aspheric surface.

Further, aspheric surfaces of the first forward lens group (GF1) and the second rear lens group (GF2) are simultaneously formed so as to be complementary each other in order to further effectively function.

According to the thirteenth embodiment according to the present invention, since the weight of a mobile part is lighten in comparison with the prior art in which the entire image forming lens is moved, it is advantageous for realizing a high-speed focusing and saving electric power.

Meanwhile, upon incorporating the image forming lens according to the present invention as a photographing optical system, if it has a mechanism by which an interval of each lens group or a focusing part is shorten so as to store in a compact manner, it is advantageous in that a mechanism for storing the second lens group (G2) is common to a focusing mechanism.

According to the third embodiment of an image forming lens according to the present invention, in the first or second embodiment thereof, wherein the following conditional equations are satisfied:

$$62.0 < v_{dp1} < 98.0$$

$$20.0 < v_{dn1} < 45.0$$

$$20.0 < v_{dn2} < 45.0$$

$$35.0 < v_{dp2} < 98.0$$

$$-20.0 < v_{dn1} - v_{dn2} < 15.0$$

wherein $v_{dp1}$ is Abbe's number of the first positive lens of the second F lens group, $v_{dn1}$ is Abbe's number of the first negative lens, $v_{dn2}$ is Abbe's number of the second negative lens, and $v_{dp2}$ is Abbe's number of the second positive lens.

Examples 1 to 7 which will be described below are also the embodiments of the image forming lens according to the present invention and at the same time show Examples which are specifically structured by means of the specific Numerical Examples.

The embodiments of cameras and mobile information terminal devices according to the present invention in which the image forming lens is employed as an optical system for photographing such as described and shown in Examples 1 to 7 will be described below with reference to the drawings of FIGS. 15 to 17.

Specific Examples of the image forming lens according to the present invention will be described and shown below.

Further, in all of the embodiments, a maximum image height is 4.80 mm.

In each Example, a parallel plate MF disposed on the image side of the rear side second lens group 2R assumes various types of optical filters, such as an optical low-pass filter and infrared cut filter, or a cover glass (seal glass) of a light-receiving element such as a CCD sensor.

Aberrations in each Example are sufficiently corrected or controlled.

Spherical aberration and longitudinal chromatic aberration are small enough to be almost negligible.

Astigmatism, curvature of field and chromatic aberration of magnification are sufficiently small.

Coma and color difference thereof are sufficiently corrected or controlled up to the most peripheral portion thereof.

Distortional aberration is suppressed to less than 2.0%.

With the arrangement of the image forming lens according to the present invention, it is obvious from the Examples that, although it achieves a half angle of view of 38 degrees or more and an F value (number) of less or equal than 2.0, it is possible to ensure an extremely good image performance.

Reference numbers used hereinafter denote as follows:
f: total focal length of the lens system
F: F value (number)
ω: half angle of view
R: curvature radius
D: interval
$N_d$: refractive index
$v_d$: Abbe's number
K: conic constant of aspheric surface
$A_4$: fourth order aspheric coefficient
$A_6$: sixth order aspheric coefficient
$A_8$: eighth order aspheric coefficient
$A_{10}$: tenth order aspheric coefficient Where C is defined as an inverse of a paraxial curvature radius (paraxial curvature), H is also defined as a height from an optical axis of the image forming lens system, X is a variation from a surface apex toward a direction along an optical axis of the lens system, and $A_{2i}$ is an aspheric surface coefficient. As a result, the aspheric surfaces are defined by the following equation:

$$X = \frac{CH^2}{1+\sqrt{1-(1+K)C^2H^2}} + A_4 \cdot H^4 + A_6 \cdot H^6 + A_8 \cdot H^8 + A_{10} \cdot H^{10} \quad (1)$$

FIG. 1 shows a configuration of an image forming lens according to Example 1 of the present invention and schematically shows a vertical section along an optical axis.

The optical system shown in FIG. 1 comprises: from an object side to an image side in sequence, a first lens E1 of a negative meniscus lens having a convex surface facing the object side, a second lens E2 of a negative meniscus lens having a convex surface facing the object side, a third lens E3 of a positive lens comprising a biconvex lens, an aperture stop FA, a cemented lens by firmly cementing a fourth lens E4 of a positive lens comprising a biconvex lens, and a fifth lens E5 of a negative meniscus lens, a cemented lens by firmly cementing a sixth lens E6 of a negative meniscus lens and a seventh lens E7 comprising a biconvex lens, and an eighth len's of a negative meniscus lens having an aspheric surface formed on the object side.

A first lens group G1 comprises the first lens E1, the second lens E2, and the third lens E3 which are positioned nearer to the object side with respect to the aperture stop FA. A second lens group G2 comprises the fourth E4, the fifth lens E5 and the sixth lens E6, the seventh lens E7 and the eighth lens E8, and the ninth lens E9 which are positioned nearer to the image side with respect to the aperture stop FA.

Further, the first lens group G1 comprises a front (object) side first lens group GF1 including two negative lenses or the first lens E1 and the second lens E2 which are positioned in the object side bordered by a most widely distance in the first lens group G1, and an image side first lens group GR1 comprising a positive lens or a third lens E3, which is positioned nearest to the image side than the object side first lens group GF1.

Meanwhile, the second lens group G2 comprises; from the object side to the image side in sequence, an object side second lens group GF2 in which the fourth lens E4 as a first positive lens, the fifth lens E5 as a first negative lens, the sixth lens E6 as a second negative lens, and the seventh lens E7 as a second positive lens are sequentially arranged, and an image side second lens group GR2 comprising the eighth lens E8 or a single negative lens which is positioned nearest to the image side than the object side second lens group GF2.

An image side surface 4 of the second lens E2 of the object side first lens group GF1 and an object side surface 14 of the eighth lens E8 of the image side second lens group GR2 each formed with an aspheric surface, respectively.

The fourth lens E4 and the fifth lens E5 of the object side second lens group GF2 are firmly cemented to constitute a cemented lens. The sixth lens E6 and the seventh lens E7 of the object side second lens group GF2 are firmly cemented to constitute a cemented lens.

In an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred to as "an optical filter FS"), is/are interposed between a final surface of the eight lens E8 and an image surface FS. For example, a single parallel plate glass P1 is inserted between the final surface of the eighth lens E8 and the image surface FS.

In this Example 1, focusing to an object at a predetermined distance is executed by moving the entire or a part of the second lens group G2.

Meanwhile, in FIG. 1, each optical surface is numbered.

Furthermore, each reference number in FIG. 1 is commonly used in each of Examples to avoid cumbersome description in the drawings due to increased numbers of reference numbers. For this reason, although the reference numbers common to those in FIG. 1 will be used for the different configurations of the image forming lens in each of the Examples, the configuration in FIG. 1 is not common to those in the remaining Examples.

Further, FIG. 8 is a view illustrating an aberration curve of a spherical aberration, astigmatism, distortion and coma aberration of the image forming lens of the Example 1 according to the present invention shown in FIG. 1, when the object to be imaged in the image forming lens as shown in FIG. 1 is placed at an infinite distance from the image forming lens.

In the Numerical Example 1, the focal length f=6.00, F value (number)=1.92, and the half angle of view ω=39.0°. Optical properties of each optical element are shown in the following table.

TABLE 1

Numerical Example 1
f = 6.00, F = 1.92, ω = 39.0

| Surface No. | R | D | $N_d$ | $v_d$ | $\Delta\theta_{g,F}$ | Glass |
|---|---|---|---|---|---|---|
| 01 | 17.915 | 1.20 | 1.49700 | 81.54 | 0.0280 | OHARA S-FPL51 |
| 02 | 6.474 | 2.28 | | | | |
| 03 | 10.587 | 1.27 | 1.51633 | 64.06 | −0.0045 | OHARA L-BSL7 |
| 04* | 5.000 | 11.43 | | | | |
| 05 | 17.508 | 3.51 | 1.69100 | 54.82 | −0.0079 | OHARA S-LAL9 |
| 06 | −33.849 | 5.11 | | | | |
| 07 | APERTURE STOP | 3.05 | | | | |
| 08 | 39.197 | 3.05 | 1.49700 | 81.54 | 0.0280 | OHARA S-FPL51 |
| 09 | −8.187 | 0.80 | 1.78470 | 26.29 | 0.0146 | OHARA S-TIH23 |
| 10 | −29.420 | 0.10 | | | | |
| 11 | 14.787 | 0.80 | 1.72825 | 28.46 | 0.0123 | OHARA S-TIH10 |
| 12 | 10.565 | 2.82 | 1.69100 | 54.82 | −0.0079 | OHARA S-LAL9 |
| 13 | −33.173 | 2.40 | | | | |
| 14* | 17.744 | 1.00 | 1.51633 | 64.06 | −0.0045 | OHARA L-BSL7 |
| 15 | 16.286 | 5.38 | | | | |
| 16 | ∞ | 1.24 | 1.51680 | 64.20 | | Various type filter(s) |
| 17 | ∞ | | | | | |

In Table 1, an asterisk (*) indicates that the surface is aspheric.

That is, each of optical surfaces of a fourth surface and 14th surface are aspheric and the parameters in the Equation for each aspheric surface are as follows.

Aspheric surface: the 4th surface $K=-0.82391, A_4=1.51453 \times 10^{-4}, A_6=-8.03748 \times 10^{-6},$
$A_8=2.33697 \times 10^{-7}, A_{10}=-1.16222 \times 10^{-8}$ Aspheric surface: the 14th surface $K=-26.92849, A_4=9.33931 \times 10^{-5}, A_6=-1.79865 \times 10^{-5},$
$A_8=3.06532 \times 10^{-7}, A_{10}=-3.57164 \times 10^{-9}$ Each of values according to the above-mentioned conditions [$L_{2F}/L$], [$f_A/f_1$], [$A_{1F-1R}/L_1$] in this Numerical Example 1 are as follows:

The values used in the above-mentioned conditions of the Example 1

$L_{2F}/L=0.164$ $f_A/f_1=0.192$ $A_{1F-1R}/L_1=0.580$

Accordingly, the numerical values according to the above-mentioned conditions in the Numerical Example 1 are within the conditions.

FIG. 8 is a view illustrating an aberration curve illustrating the property of each of the aberrations of a spherical aberration, astigmatism, distortion and coma aberration of the image forming lens of the Numerical Example 1 as described above according to the present invention shown in FIG. 1.

Among the aberration curves, the broken line in the spherical aberration curves indicates a sine condition, in astigmatism curves, the solid line indicates a sagittal image plane, and the broken line indicates a meridional image plane.

According to the image forming lens which is arranged as shown in FIG. 1 of the above-mentioned Numerical Example 1 according to the present invention, aberrations therein are sufficiently corrected or controlled as shown in FIG. 8 and thus spherical aberration and longitudinal chromatic aberration are small enough to be almost negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed to less than 2.0%.

With the arrangement of the image forming lens according to the present invention, it is obvious from the Numerical Example 1 that, although it achieves a wide half angle of view of 38 degrees or so and an F value (number) around 2.00 or so, it is able to ensure an extremely good image performance.

Figure 2:
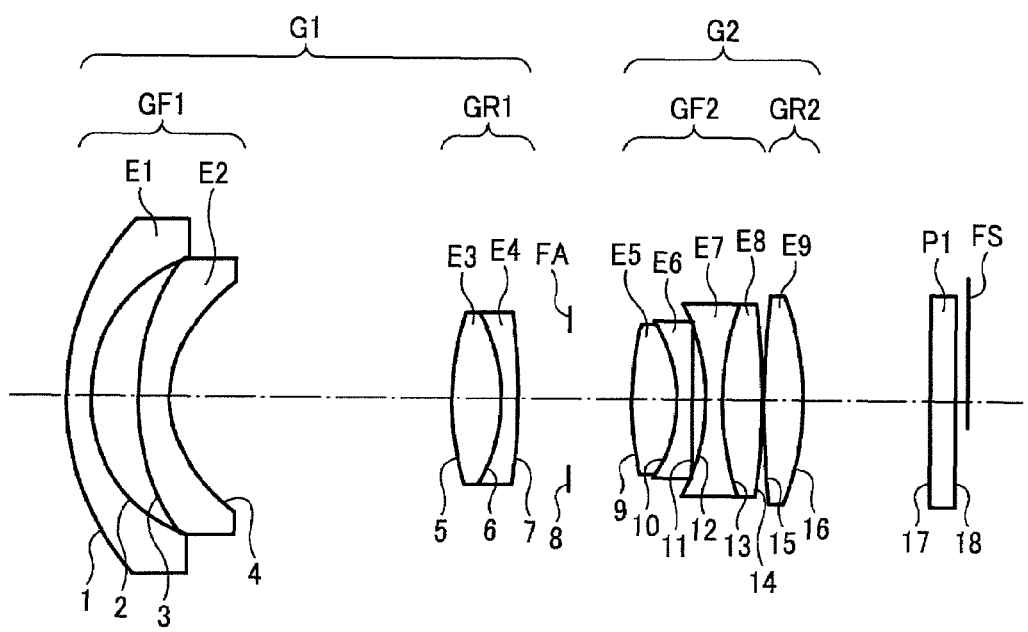
FIG. 2 is a sectional view illustrating an arrangement of an image forming lens of Numerical Example 2 according to the present invention.

FIG. 2 shows a configuration of an image forming lens of Example 2 according to the present invention (which corresponds to a second embodiment according to the present invention) and schematically shows a vertical section along an optical axis.

The optical system (image forming lens) shown in FIG. 2 comprises: from an object side to an image side in sequence, a first lens E1 of a negative meniscus lens having a largely concave surface facing the image side (namely, a convex surface facing the object side), similarly, second lens E2 of a negative meniscus lens having a largely concave surface facing the image side, a third lens E3 of a positive lens comprising a biconvex lens, a fourth lens E4 of a negative meniscus lens having a largely concave surface facing the object side, an aperture stop FA, a fifth lens E5 of a positive lens comprising a biconvex lens, a sixth lens E6 of a negative meniscus lens having a largely concave surface facing the object side, a seventh lens E7 of a negative lens comprising a biconcave lens having a largely concave surface facing the object side, an eighth lens E8 of a positive lens comprising a biconvex lens having a largely convex surface facing the object side, and a ninth lens E9 of a positive lens comprising a biconvex lens having a largely convex surface facing the image side.

A first lens group G1 comprises the first lens E1, the second lens E2, the third lens E3, and the fourth lens E4 which are positioned nearer to the object side with respect to the aperture stop FA. A second lens group G2 comprises the fifth lens E5 and the sixth lens E6, the seventh lens E7 and the eighth lens E8, and the ninth lens E9 which are positioned nearer to the image side with respect to the aperture stop FA.

Further, the first lens group G1 comprises an object side lens group GF1 including two negative lenses which are bounded by a most widest distance in the first lens group G1 and positioned in the object side, namely the first lens E1 and the second lens E2, and an image side lens group GR1 including a positive lens or the third lens E3 and a negative lens or the fourth lens E4 which are positioned nearer to the image side than the object side first lens group GF1.

Meanwhile, the second lens group G2 comprises, from the object side in sequence, an object side second lens group GF2 in which the fourth lens E5 as a first positive lens, the sixth lens E6 as a first negative lens, the seventh lens E7 as a second negative lens, and the eighth lens E8 as a second positive lens are positioned in sequence, and an image side second lens group GR2 including a single positive lens which is positioned nearer to the image side than the object side second lens group GF2.

An image side surface 4 of the second lens E2 of the object side first lens group GF1 and an object side surface 15 of the ninth lens E9 of the image side second lens group GR2 each formed with an aspheric surface, respectively.

The third lens E3 and the fourth lens E4 of the object side second lens group GR1 are firmly cemented to constitute a cemented lens. The fifth lens E5 and the sixth lens E6 of the object side second lens group GF2 are firmly cemented to constitute a cemented lens.

Further, in an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred as to "an optical filter FS"), is/are interposed between a final surface of the ninth lens E9 and an image surface FS. For example, a single parallel plate glass P1 is inserted between the final surface of the ninth lens E9 and the image surface FS.

In this Example 2, focusing to an object at a predetermined distance is executed by moving the entire or a part of the second lens group G2.

Meanwhile, in FIG. 2, each optical surface is numbered.

Furthermore, each reference number in FIG. 2 is commonly used in each of Examples to avoid cumbersome description in the drawings due to increased numbers of reference numbers. For this reason, although the reference numbers common to those in FIG. 2 will be used for the different configurations of the image forming lens in each of the Examples, the configuration in FIG. 2 is not common to those in the remaining Examples.

Further, FIG. 9 is a view illustrating an aberration curve of a spherical aberration, astigmatism, distortion and coma aberration of the image forming lens of the Example 2 according to the present invention shown in FIG. 2, when the object to be imaged in the image forming lens as shown in FIG. 2 is placed at an infinite distance from the image forming lens.

In the Numerical Example 2, the focal length f=5.90, F value (number)=2.04, and the half angle of view ω=39.2°. Optical properties of each optical element are shown in the following table.

TABLE 2

Numerical Example 2
f = 5.90, F = 2.04, α = 39.2

| Surface No. | R | D | $N_d$ | $\nu_d$ | $\Delta\theta_{g,F}$ | Glass |
|---|---|---|---|---|---|---|
| 01 | 12.229 | 1.20 | 1.71300 | 53.87 | −0.0084 | OHARA S-LAL8 |
| 02 | 6.993 | 2.34 | | | | |
| 03 | 11.666 | 1.46 | 1.51633 | 64.06 | −0.0045 | OHARA L-BSL7 |
| 04* | 5.000 | 13.88 | | | | |
| 05 | 12.778 | 2.42 | 1.80610 | 40.93 | −0.0052 | OHARA S-LAH53 |
| 06 | −8.157 | 0.80 | 1.85026 | 32.27 | 0.0036 | OHARA S-LAH71 |
| 07 | −32.381 | 2.55 | | | | |
| 08 | APERTURE STOP | 3.00 | | | | |
| 09 | 15.291 | 2.12 | 1.49700 | 81.54 | 0.0280 | OHARA S-FPL51 |
| 10 | −6.828 | 0.80 | 1.68893 | 31.07 | 0.0092 | OHARA S-TIM28 |
| 11 | −548.914 | 0.63 | | | | |
| 12 | −9.532 | 0.80 | 1.71736 | 29.52 | 0.0110 | OHARA S-TIH1 |
| 13 | 12.818 | 1.94 | 1.83481 | 42.71 | −0.0082 | OHARA S-LAH55 |
| 14 | −39.742 | 0.10 | | | | |
| 15* | 24.958 | 1.95 | 1.76802 | 49.24 | −0.0081 | HOYA M-TAF101 |
| 16 | −13.517 | 6.19 | | | | |
| 17 | ∞ | 1.24 | 1.51680 | 64.20 | | Various type filter(s) |
| 18 | ∞ | | | | | |

In Table 2, an asterisk (*) indicates that the surface is aspheric.

That is, each of optical surfaces of a fourth surface and 15th surface are aspheric and the parameters in the Equation (1) for each aspheric surface are as follows.

Aspheric surface: the 4th surface $$K=-0.41935, A_4=-5.42080\times10^{-5}, A_6=-2.48263\times10^{-5},$$
$$A_8=7.57412\times10^{-7}, A_{10}=-2.30755\times10^{-8}$$

Aspheric surface: the 15th surface $$K=0.0, A_4=-3.94481\times10^{-4}, A_6=7.14419\times10^{-7},$$
$$A_8=6.43089\times10^{-8}, A_{10}=-2.58953\times10^{-9}$$

Each of values according to the above-mentioned conditions ($L_{2F}/L$), ($f_A/f_1$), ($A_{1F-1R}/L_1$) in this Numerical Example 2 are as follows:

The values used in the above-mentioned conditions of the Example 2

$$L_{2F}/L=0.143$$

$$f_A/f_1=0.604$$

$$A_{1F-1R}/L_1=0.628$$

Accordingly, the numerical values according to the above-mentioned conditions in the Numerical Example 2 are within the conditions.

FIG. 9 is a view illustrating an aberration curve illustrating the property of each of the aberrations of a spherical aberration, astigmatism, distortion and coma aberration of the image forming lens of the Numerical Example 2 according to the present invention shown in FIG. 2.

Among the aberration curves, the broken line in the spherical aberration curves indicates a sine condition, in astigmatism curves, the solid line indicates a sagittal image plane, and the broken line indicates a meridional image plane.

According to the image forming lens which is arranged as shown in FIG. 2 of the above-mentioned Numerical Example 2 according to the present invention, aberrations therein are sufficiently corrected or controlled as shown in FIG. 9 and thus spherical aberration and longitudinal chromatic aberration are small enough to be almost negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens L2 according to the present invention, it is obvious from the Numerical Example 2 that, although it achieves a wide half angle of view of 38 degrees or so and a F value (number) around 2.00 or so, it is possible to ensure an extremely good image performance.

Figure 3:
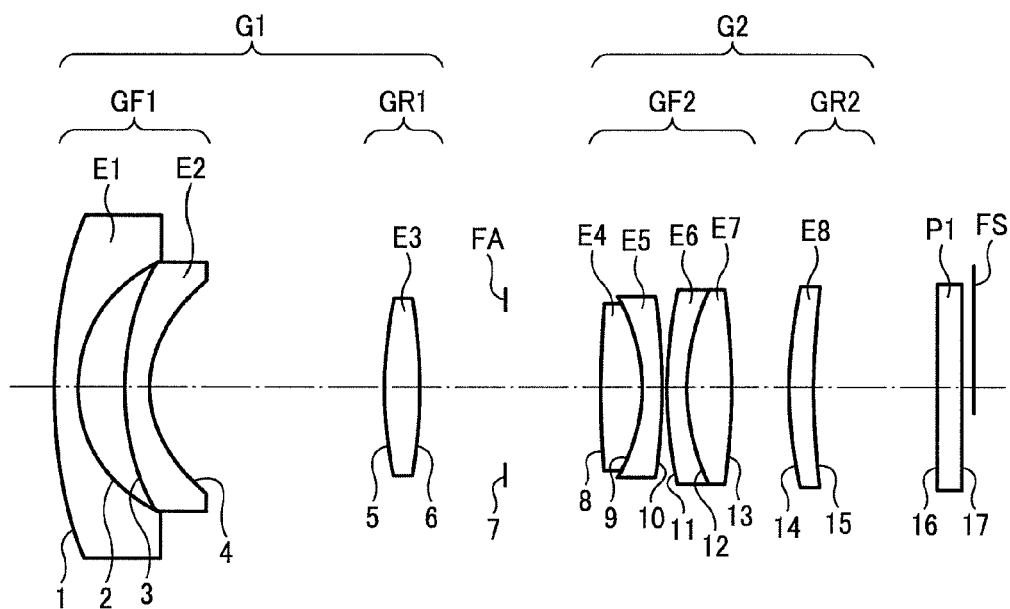
FIG. 3 is a sectional view illustrating an arrangement of an image forming lens of Numerical Example 3 according to the present invention.

FIG. 3 shows a configuration of an image forming lens of Example 3 according to the present invention (which corresponds to a third embodiment according to the present invention) and schematically shows a vertical section along an optical axis.

The optical system (image forming lens) shown in FIG. 3 comprises: from an object side to an image side in sequence, a first lens E1 of a negative meniscus lens having a largely concave surface facing the image side, a second lens E2 of a negative meniscus lens having a largely concave surface facing the image side, a third lens E3 of a positive lens comprising a biconvex lens, an aperture stop FA, a fourth lens E4 of a positive lens comprising a biconvex lens, a fifth lens E5 of a negative meniscus lens having a largely concave surface facing the object side, a sixth lens E6 of a negative meniscus lens having a largely concave surface facing the image side, a seventh lens E7 of a positive lens comprising a biconvex lens having a largely convex surface facing the object side, and an eighth lens E8 of a positive meniscus lens having a largely convex surface facing the object side.

A first lens group G1 comprises the first lens E1, the second lens E2, and the third lens E3 which are positioned nearer to the object side with respect to the aperture stop FA. A second lens group G2 comprises the fourth lens E4, the fifth lens E5, the sixth lens E6, the seventh lens E7, the eighth lens E8, and the ninth lens E9 which are positioned nearer to the image side with respect to the aperture stop FA.

Further, the first lens group G1 comprises an object side lens group GF1 including two negative lenses which are bounded by a most widest distance in the first lens group G1 and positioned in the object side, namely the first lens E1 and the second lens E2, and an image Bide lens group GR1 including a positive lens or the third lens E3 which is positioned nearer to the image side than the object side first lens group GF1.

Meanwhile, the second lens group G2 comprises, from the object side in sequence, an object side second lens group GF2 in which the fourth lens E4 as a first positive lens, the fifth lens E5 as a first negative lens, the sixth lens E6 as a second positive lens, and the seventh lens E7 as a second negative lens are positioned in sequence, and an image side second lens group GR2 including a single positive lens E8 which is positioned nearer to the image side than the object side second lens group GF2.

An image side surface 4 of the second lens E2 of the object side first lens group GF1 and an object side surface 14 of the eighth lens E8 of the image side second lens group GR2 each formed with an aspheric surface, respectively.

The fourth lens E4 and the fifth lens E5 of the object side second lens group GF2 are firmly cemented to constitute a cemented lens. The sixth lens E6 and the seventh lens E7 of the object side second lens group GF2 are firmly cemented to constitute a cemented lens.

Further, in an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred as to "an optical filter FS"), is/are interposed between a final surface of the eighth lens E8 and an image surface FS. For example, a single parallel plate glass P1 is inserted between the final surface of the eighth lens E8 and the image surface FS.

In this Example 3, focusing to an object at a predetermined distance is executed by moving the entire or a part of the second lens group G2.

Meanwhile, in FIG. 3, each optical surface is numbered.

Furthermore, each reference number in FIG. 3 is commonly used in each of Examples to avoid cumbersome description in the drawings due to increased numbers of reference numbers. For this reason, although the reference numbers common to those in FIG. 3 will be used for the different configurations of the image forming lens in each of the Examples, the configuration in FIG. 3 is not common to those in the remaining Examples.

Further, FIG. 10 is a view illustrating an aberration curve of a spherical aberration, astigmatism, distortional aberration and coma aberration of the image forming lens of the Example 3 according to the present invention shown in FIG. 3, when the object to be imaged in the image forming lens as shown in FIG. 3 is placed at an infinite distance from the image forming lens.

In the Numerical Example 3, the focal length f=6.00, F value (number)=1.95, and the half angle of view ω=39.1 degrees. Optical properties of each optical element are shown in the following table.

TABLE 3

Numerical Example 3
f = 6.00, F = 1.95, α = 39.1

| Surface No. | R | D | $N_d$ | $v_d$ | $\Delta\theta_{g,F}$ | Glass |
|---|---|---|---|---|---|---|
| 01 | 22.824 | 1.20 | 1.48749 | 70.24 | 0.0022 | OHARA S-FSL5 |
| 02 | 6.600 | 2.27 | | | | |
| 03 | 11.856 | 1.28 | 1.51633 | 64.06 | −0.0045 | OHARA L-BSL7 |
| 04* | 5.000 | 11.53 | | | | |
| 05 | 18.323 | 1.81 | 1.69350 | 53.18 | −0.0072 | OHARA L-LAL13 |
| 06* | −26.515 | 4.31 | | | | |
| 07 | APERTURE STOP | 4.61 | | | | |
| 08 | 43.943 | 1.99 | 1.49700 | 81.54 | 0.0280 | OHARA S-FPL51 |
| 09 | −9.000 | 1.00 | 1.74077 | 27.79 | 0.0130 | OHARA S-TIM13 |
| 10 | −32.779 | 0.20 | | | | |
| 11 | 19.707 | 1.00 | 1.69895 | 30.13 | 0.0103 | OHARA S-TIM35 |
| 12 | 9.972 | 2.28 | 1.60300 | 65.44 | 0.0045 | OHARA S-PHM53 |
| 13 | −36.934 | 2.87 | | | | |
| 14* | 15.450 | 1.26 | 1.51633 | 64.06 | −0.0045 | OHARA L-BSL7 |
| 15 | 37.405 | 6.03 | | | | |
| 16 | ∞ | 1.24 | 1.51680 | 64.20 | | Various type filter(s) |
| 17 | ∞ | | | | | |

In Table 3, an asterisk (*) indicates that the surface is aspheric.

That is, each of optical surfaces of a fourth surface, a sixth surface and a 14th surface are aspheric and the parameters in the Equation (1) for each aspheric surface are as follows.

Aspheric surface: the fourth surface $K=-0.82391, A_4=7.26169\times10^{-5}, A_6=-5.10959\times10^{-6}, A_8=4.38244\times10^{-8}, A_{10}=-6.967612\times10^{-9}$ Aspheric surface: the sixth surface $K=0.0, A_4=2.05935\times10^{-5}, A_6=-1.04777\times10^{-6}, A_8=8.84156\times10^{-8}, A_{10}=-2.25119\times10^{-9}$ Aspheric surface: the 14th surface $K=-26.92849, A_4=5.11073\times10^{-4}, A_6=-2.92185\times10^{-5}, A_8=7.49033\times10^{-7}, A_{10}=-1.06280\times10^{-8}$ Each of values according to the above-mentioned conditions $[L_{2F}/L], [f_4/f_1], [A_{1F-1R}/L_1]$ in this Numerical Example 1 are as follows:

The values used in the above-mentioned conditions of the Example 1

$L_{2F}/L=0.142$ $f_A/f_1=0.243$ $A_{1F-1R}/L_1=0.637$

Accordingly, the numerical values according to the above-mentioned conditions in the Numerical Example 3 are within the conditions.

FIG. 10 is a view illustrating an aberration curve illustrating the property of each of the aberrations of a spherical aberration, astigmatism, distortion and coma aberration of the image forming lens L3 of the Numerical Example 3 according to the present invention shown in FIG. 3.

Among the aberration curves, the broken line in the spherical aberration curves indicates a sine condition, in astigmatism curves, the solid line indicates a sagittal image plane, and the broken line indicates a meridional image plane.

According to the image forming lens L3 which is arranged as shown in FIG. 3 of the above-mentioned Numerical Example 3 according to the present invention, aberrations therein are sufficiently corrected or controlled as shown in FIG. 10 and thus spherical aberration and longitudinal chromatic aberration are small enough to be almost negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens L1 according to the present invention, it is obvious from the numerical Example 1 that, although it achieves a wide half angle of view of 39 degrees or so and a F value (number) around 2.00 or so, it is possible to ensure an extremely good image performance.

Figure 4:
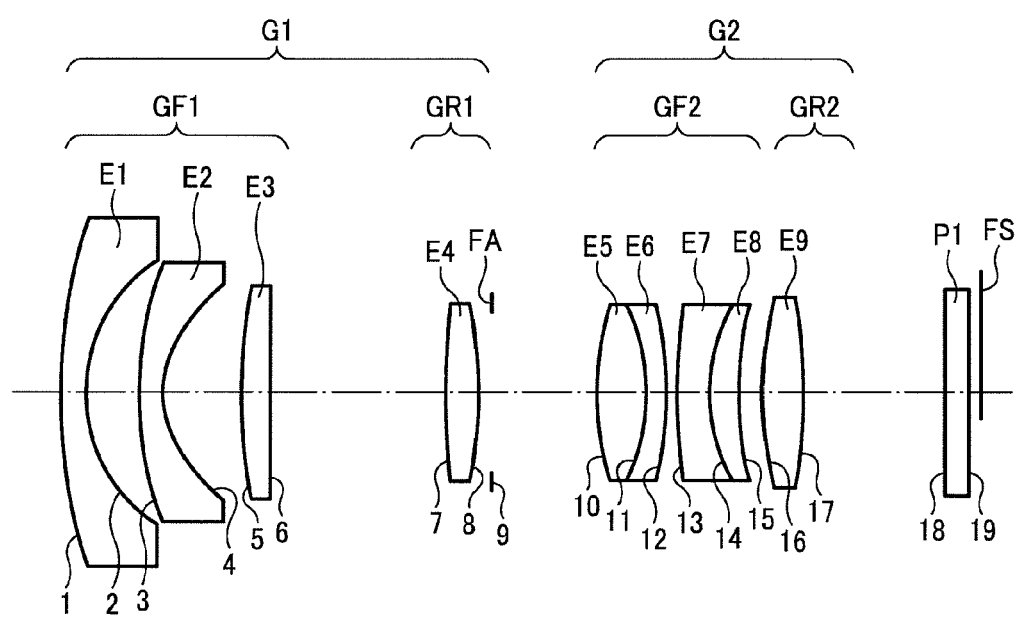
FIG. 4 is a sectional view illustrating an arrangement of an image forming lens of Numerical Example 4 according to the present invention.

FIG. 4 shows a configuration of an image forming lens of Example 4 according to the present invention (which corresponds to a fourth embodiment according to the present invention) and schematically shows a vertical section along an optical axis.

The optical system (image forming lens) shown in FIG. 4 comprises: from an object side to an image side in sequence, a first lens E1 of a negative meniscus lens having a largely concave surface facing the image side, a second lens E2 of a negative meniscus lens having a largely concave surface facing the image side, a third lens E3 of a positive meniscus lens, a fourth lens E4 of a positive lens comprising a biconvex lens, an aperture stop FA, a fifth lens E5 of a positive lens comprising a biconvex lens, a sixth lens E6 of a negative meniscus lens having a largely concave surface facing the object side, a seventh lens E7 of a negative meniscus lens having a largely concave surface facing the image side, an eighth lens E8 of a positive meniscus lens having a largely convex surface facing the object side, and a ninth lens E9 of a positive lens comprising a biconvex lens having a largely convex surface facing the object side.

A first lens group G1 comprises the first lens E1, the second lens E2, the third lens E3 and the fourth lens E4 which are positioned nearer to the object side with respect to the aperture stop FA. A second lens group G2 comprises the fifth lens E5, the sixth lens E6, the seventh lens E7, the eighth lens. E8, and the ninth lens E9 which are positioned nearer to the image side with respect to the aperture stop FA.

Further, the first lens group G1 comprises an object side lens group GF1 including two negative lenses which are bounded by a most widest distance in the first lens group G1 and positioned in the object side, namely the first lens E1, the second lens E2, and the third lens E3 as a positive lens, and an image side lens group GR1 including a positive lens or the fourth lens E4 which is positioned nearer to the image side than the image side first lens group GF1.

Meanwhile, the second lens group G2 comprises, from the object side in sequence, an object side second lens group GF2 in which the fifth lens E5 as a first positive lens, the sixth lens E6 as a first negative lens, the seventh lens E7 as a second negative lens, and the eighth lens E8 as a second positive lens are positioned in sequence, and an image side second lens group GR2 including the ninth lens E9 as a single positive lens which is positioned nearer to the image side than the object side second lens group GF2.

An image side surface 4 of the second lens E2 of the object side first lens group GF1 and an object side surface 16 of the ninth lens E9 of the image side second lens group GR2 each formed with an aspheric surface, respectively.

The fifth lens E5 and the sixth lens E6 of the object side second lens group GF2 are firmly cemented to constitute a cemented lens. The seventh lens E7 and the eighth lens E8 are firmly cemented to constitute a cemented lens.

Further, in an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred as to "an optical filter FS"), is/are interposed between a final surface of the ninth lens E9 and an image surface FS. For example, a single parallel plate glass P1 is inserted between the final surface of the ninth lens E9 and the image surface FS.

In this Example 4, focusing to an object at a predetermined distance is executed by moving the entire or a part of the second lens group G2.

Meanwhile, in FIG. 4, each optical surface is numbered.

Furthermore, each reference number in FIG. 4 is commonly used in each of Examples to avoid cumbersome description in the drawings due to increased numbers of reference numbers. For this reason, although the reference numbers common to those in FIG. 4 will be used for the different configurations of the image forming lens in each of the Examples, the configuration in FIG. 4 is not common to those in the remaining Examples.

Further, FIG. 11 is a view illustrating an aberration curve of a spherical aberration, astigmatism, distortion and coma aberration of the image forming lens of the Example 4 according to the present invention shown in FIG. 4, when the object to be imaged in the image forming lens as shown in FIG. 4 is placed at an infinite distance from the image forming lens.

In the Numerical Example 4, the focal length f=6.00, F value (number)=1.96, and the half field of angle ω=39.1°. Optical properties of each optical element are shown in the following table.

TABLE 4

Numerical Example 4
f = 6.00, F = 1.96, α = 39.1

| Surface No. | R | D | $N_d$ | $v_d$ | $\Delta\theta_{g,F}$ | Glass |
|---|---|---|---|---|---|---|
| 01 | 25.683 | 1.20 | 1.48749 | 70.24 | 0.0022 | OHARA S-FSL5 |
| 02 | 7.430 | 2.64 | | | | |
| 03 | 16.000 | 1.20 | 1.51633 | 64.06 | −0.0045 | OHARA L-BSL7 |
| 04* | 4.763 | 3.85 | | | | |
| 05 | 25.619 | 1.42 | 1.83481 | 42.71 | −0.0082 | OHARA S-LAH55 |
| 06 | 127.934 | 8.75 | | | | |
| 07 | 32.911 | 1.59 | 1.66672 | 48.32 | −0.0024 | OHARA S-BAH11 |
| 08 | −23.844 | 0.70 | | | | |
| 09 | APERTURE STOP | 5.16 | | | | |
| 10 | 13.187 | 2.36 | 1.49700 | 81.54 | 0.0280 | OHARA S-FPL51 |
| 11 | −10.110 | 1.00 | 1.72047 | 34.71 | −0.0019 | OHARA S-NBH8 |
| 12 | −19.398 | 0.50 | | | | |
| 13 | 30.091 | 1.65 | 1.75520 | 27.51 | 0.0133 | OHARA S-TIH4 |
| 14 | 8.000 | 1.49 | 1.49700 | 81.54 | 0.0280 | OHARA S-FPL51 |
| 15 | 15.165 | 1.20 | | | | |
| 16* | 13.879 | 2.00 | 1.51633 | 64.06 | −0.0045 | OHARA L-BSL7 |
| 17 | −31.006 | 6.96 | | | | |
| 18 | ∞ | 1.24 | 1.51680 | 64.20 | | Various type filter(s) |
| 19 | ∞ | | | | | |

In Table 4, an asterisk (*) indicates that the surface is aspheric.

That is, each of optical surfaces of a fourth surface and 16th surface are aspheric and the parameters in the Equation (1) for each aspheric surface are as follows.

Aspheric surface: the 4th surface $$K=-0.40687, A_4=-3.60864\times10^{-4}, A_6=-2.38402\times10^{-5},$$
$$A_8=6.28983\times10^{-7}, A_{10}=-2.42525\times10^{-8}$$

Aspheric surface: the 16th surface $$K=0.0, A_4=-4.01894\times10^{-4}, A_6=3.25574\times10^{-6}, A_8=-2.41480\times10^{-7}, A_{10}=3.20689\times10^{-9}$$

Each of values according to the above-mentioned conditions $[L_{2F}/L]$, $[f_A/f_1]$, $[A_{1F-1R}/L_1]$ in this numerical Example 4 are as follows:

The values used in the above-mentioned conditions of the Example 4

$$L_{2F}/L=0.154$$

$$f_A/f_1=0.183$$

$$A_{1F-1R}/L_1=0.424$$

Accordingly, the numerical values according to the above-mentioned conditions in the Numerical Example 4 are within the conditions.

FIG. 11 is a view illustrating an aberration curve illustrating the property of each of the aberrations of a spherical aberration, astigmatism, distortional aberration and coma aberration of the image forming lens of the Numerical Example 4 according to the present invention shown in FIG. 4.

Among the aberration curves, the broken line in the spherical aberration curves indicates a sine condition, in astigmatism curves, the solid line indicates a sagittal image plane, and the broken line indicates a meridional image plane.

Figure 5:
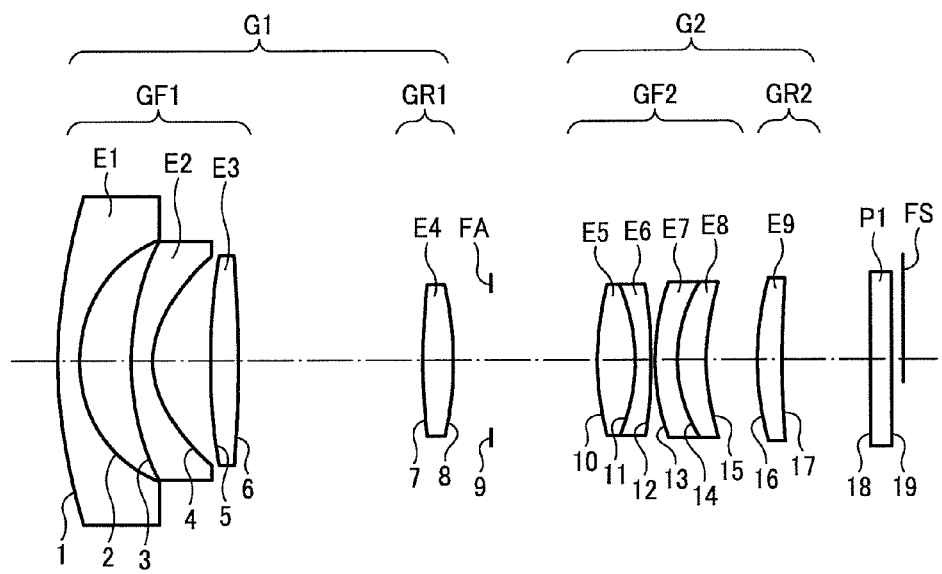
FIG. 5 is a sectional view illustrating an arrangement of an image forming lens of Numerical Example 5 according to the present invention.

According to the image forming lens which is arranged as shown in FIG. 5 of the above-mentioned Numerical Example 4 according to the present invention, aberrations therein are sufficiently corrected or controlled as shown in FIG. 11 and thus spherical aberration and longitudinal chromatic aberration are small enough to be negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens according to the present invention, it is obvious from the Numerical Example 4 that, although it achieves a wide half angle of view of 39 degrees or so and a F value (number) around 2.00 or so, it is possible to ensure an extremely good image performance.

Figure 6:
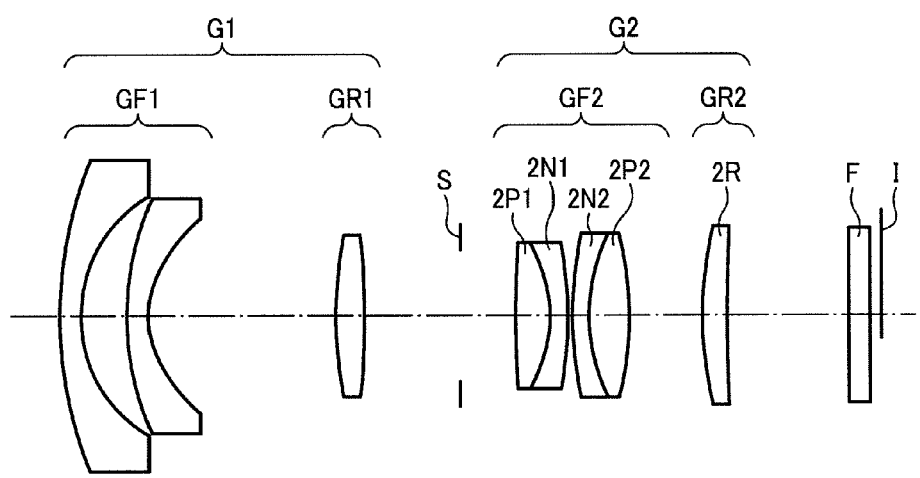
FIG. 6 is a sectional view illustrating an arrangement of an image forming lens of Numerical Example 6 according to the present invention.

FIG. 6 shows a configuration of an image forming lens of Example 5 according to the present invention (which corresponds to a fifth embodiment according to the present invention) and schematically shows a vertical section along an optical axis.

The optical system shown in FIG. 5 comprises: from an object side to an image side in sequence, a first lens E1 of a negative meniscus lens having a largely concave surface facing the image side, a second lens E2 of a negative meniscus lens having a largely concave surface facing the image side, a third lens E3 of a positive lens comprising a biconvex lens, a fourth lens E4 of a positive lens comprising a biconvex lens, an aperture stop FA, a fifth lens E5 of a positive lens comprising a biconvex lens, a sixth lens E6 of a negative meniscus lens having a largely concave surface facing the object aide, a seventh lens E7 of a negative meniscus lens having a largely concave surface facing the image side, an eighth lens E8 of a positive meniscus lens having a largely concave surface facing the object side, and a ninth lens E9 of a positive meniscus lens having a largely convex surface facing the object side.

A first lens group GI comprises the first lens El, the second lens E2, the third lens E3 and the fourth lens E4 which are positioned nearer to the object side with respect to the aperture stop FA. A second lens group G2 comprises the fifth lens E5, the sixth lens E6, the seventh lens E7, the eighth lens E8, and the ninth lens E9 which are positioned nearer to the image side with respect to the aperture stop FA.

Further, the first lens group G1 comprises an object side lens group GF1 including two negative lenses which are bounded by a most widest distance in the first lens group G1 and positioned in the object side, namely the first lens E1, the second lens E2, and the third lens E3 as a positive lens, and an image side lens group GR1 including a positive lens or the fourth lens E4 which is positioned nearer to the image side than the object side first lens group GF1.

Meanwhile, the second lens group G2 comprises, from the object side in sequence, an object side second lens group GF2 in which the fifth lens E5 as a first positive lens, the sixth lens E6 as a first negative lens, the seventh lens E7 as a second negative lens, and the eighth lens E8 as a second positive lens are positioned in sequence, and an image side second lens group GR2 including the ninth lens E9 as a single positive lens which is positioned nearer to the image side than the object side second lens group GF2.

An image side surface 4 of the second lens E2 of the object side first lens group GF1 and an object side surface 16 of the ninth lens E9 of the image side second lens group GR2 each formed with an aspheric surface, respectively.

The fifth lens E5 and the sixth lens E6 of the object side second lens group GF2 are firmly cemented to constitute a cemented lens. The seventh lens E7 and the eighth lens E8 are firmly cemented to constitute a cemented lens.

In an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred as to "an optical filter FS"), is/are interposed between a final surface of the ninth lens E9 and an image surface FS.

Meanwhile, in FIG. 5, each optical surface is numbered.

Furthermore, each reference number in FIG. 5 is commonly used in each of Examples to avoid cumbersome description in the drawings due to increased numbers of reference numbers.

For this reason, although the reference numbers common to those in FIG. 5 will be used for the different configurations of the image forming lens in each of the Examples, the configuration in FIG. 5 is not common to those in the remaining Examples.

Figure 12:
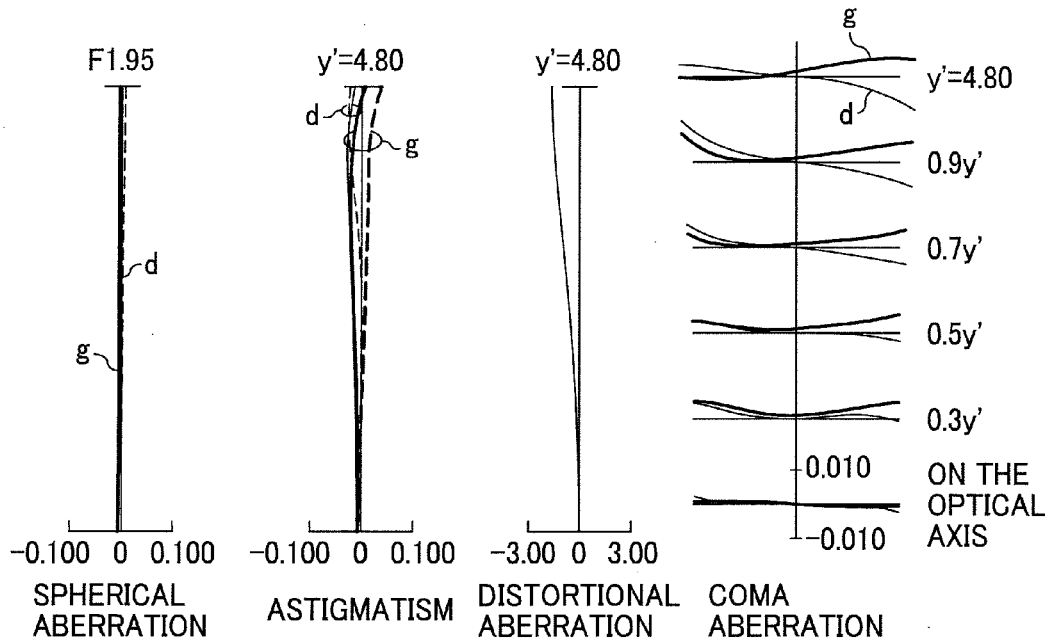
FIG. 12 is an aberration curve of an image forming lens of Numerical Example 5 according to the present invention.

Further, FIG. 12 is a view illustrating an aberration curve of a spherical aberration, astigmatism, distortion and coma aberration of the image forming lens of the Example 5 according to the present invention shown in FIG. 5.

In the Example 5, the focal length f=6.00, F value (number)=1.95, and the half angle of view ω=39.1°. Optical properties of each optical element are shown in the following table.

TABLE 5

Numerical Example 5
f = 6.00, F = 1.95, α = 39.1

| Surface No. | R | D | $N_d$ | $v_d$ | $\Delta\theta_{g,F}$ | Glass |
|---|---|---|---|---|---|---|
| 01 | 29.662 | 1.20 | 1.48749 | 70.24 | 0.0022 | OHARA S-FSL5 |
| 02 | 7.518 | 3.11 | | | | |
| 03 | 15.500 | 1.20 | 1.51633 | 64.06 | −0.0045 | OHARA L-BSL7 |
| 04* | 5.069 | 3.41 | | | | |
| 05 | 35.236 | 1.58 | 1.80440 | 39.59 | −0.0045 | OHARA S-LAH63 |
| 06 | −160.735 | 10.84 | | | | |
| 07 | 37.658 | 1.79 | 1.60300 | 65.44 | 0.0045 | OHARA S-PHM53 |
| 08 | −19.258 | 2.30 | | | | |
| 09 | APERTURE STOP | 6.13 | | | | |
| 10 | 16.288 | 2.22 | 1.49700 | 81.54 | 0.0280 | OHARA S-FPL51 |
| 11 | −11.455 | 1.00 | 1.72151 | 29.23 | 0.0111 | OHARA S-TIH18 |
| 12 | −25.036 | 0.20 | | | | |
| 13 | 12.552 | 1.34 | 1.84666 | 23.78 | 0.0175 | OHARA S-TIH53 |
| 14 | 8.000 | 1.74 | 1.49700 | 81.54 | 0.0280 | OHARA S-FPL51 |
| 15 | 14.244 | 2.97 | | | | |
| 16* | 13.690 | 1.50 | 1.51633 | 64.06 | −0.0045 | OHARA L-BSL7 |

TABLE 5-continued

Numerical Example 5
f = 6.00, F = 1.95, α = 39.1

| Surface No. | R | D | $N_d$ | $v_d$ | $\Delta\theta_{g,F}$ | Glass |
|---|---|---|---|---|---|---|
| 17 | 81.181 | 5.04 | | | | |
| 18 | ∞ | 1.24 | 1.51680 | 64.20 | | Various type filter(s) |
| 19 | ∞ | | | | | |

In Table 5, an asterisk (*) indicates that the surface is aspheric.

That is, each of optical surfaces of a fourth surface and a 16th surface are aspheric and the parameters in the Equation for each aspheric surface are as follows.

Aspheric surface: the 4th surface $K=-0.85535, A_4=3.24166\times10^{-6}, A_6=-2.56520\times10^{-6}, A_8=-3.63511\times10^{-8}, A_{10}=-1.39606\times10^{-9}$ Aspheric surface: the 16th surface $K=0.0, A_4=-3.27966\times10^{-4}, A_6=3.00723\times10^{-6}, A_8=-2.59822\times10^{-7}, A_{10}=4.26578\times10^{-9}$ Each of values according to the above-mentioned conditions [$L_{2F}/L$], [$f_A/f_1$], [$A_{1F-1R}/L_1$] in this Numerical Example 5 are as follows:

The values used in the above-mentioned conditions of the Example 5

$L_{2F}/L=0.132$ $f_A/f_1=0.238$ $A_{1F-1R}/L_1=0.469$

Accordingly, the numerical values according to the above-mentioned conditions in the Numerical Example 5 are within the conditions.

PIG. 12 is a view illustrating an aberration curve illustrating the property of each of the aberrations of a spherical aberration, astigmatism, distortion and coma aberration of the image forming lens of the Numerical Example 5 according to the present invention shown in FIG. 5.

Among the aberration curves, the broken line in the spherical aberration curves indicates a sine condition, in astigmatism curves, the solid line indicates a sagittal image plane, and the broken line indicates a meridional image plane.

According to the image forming lens which is arranged as shown in FIG. 5 of the above-mentioned Numerical Example 5 according to the present invention, aberrations therein are sufficiently corrected or controlled as shown in FIG. 12 and thus spherical aberration and longitudinal chromatic aberration are small enough to be almost negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens according to the present invention, it is obvious from the Numerical Example 5 that, although it achieves a wide half angle of view of 39 degrees or so and a F value (number) around 2.00 or so, it is possible to ensure an extremely good image performance.

FIG. 6 shows a configuration of an image forming lens of Example 6 according to the present invention (which corresponds to a sixth embodiment according to the present invention) and schematically shows a vertical section along an optical axis. The image forming lens shown in FIG.6 comprises, from an object side to an image side in sequence, a first front lens group GF1 by the reference numeral "GF1", a first rear lens group GR1 by the reference numeral "GR1", a first positive lens by the reference numeral "2P1", a first negative lens by the reference numeral "2N1", a second negative lens by the reference numeral "2N2", a second positive lens by the reference numeral "2P2", and a second rear lens group by the reference numeral "2R". The reference symbol "S" designates an aperture stop which defines the first lens group and the second lens group. In FIG. 6, the reference symbol "F" designates an optical low-pass filter, an infrared cut filter or the like, or a cover glass (seal glass) for protecting a light-receiving surface of a CCD image sensing device as being a single transparent parallel plate. The reference symbol "I" designates an image surface (a receiving surface of the image sensing device). An image forming lens of which the Examples 1 to 7 are shown in FIGS. 1 to 7 comprises a first lens group which is positioned in the object side, an aperture stop S, and a second lens group which is positioned in the image side. The first lens group comprises the first front lens group GF1 which is positioned in the object side and has a negative refractive power, and the first rear lens group which is spaced by a most widest interval among the first lens group from the first front lens group GF 1 and has on the aperture stop side the first rear lens group GR1 having a positive refractive power. The second lens group generally has a positive refractive power and comprises, from the aperture stop. S side in sequence, a second front lens group in which the first positive lens 2P1, the first negative lens 2N1, the second negative lens 2N2, and the second positive lens 2P2 are positioned in the object side, and a second rear lens group 2R comprising a single lens. The first positive lens 2P1 and the first negative lens 2N1, the second negative lens 2N2 and the second positive lens 2P2 are firmly cemented, respectively. In the Example 6, the focal length f=6.00, F value (number) =1.95, and the half angle of view ω=39.1 degrees. Optical properties of each optical element are shown in the following table.

TABLE 6

Numerical Example 6
f = 6.00, F = 1.95, α = 39.1

| Surface No. | R | D | $N_d$ | $v_d$ | $\Delta\theta_{g,F}$ | Glass |
|---|---|---|---|---|---|---|
| 01 | 22.012 | 1.20 | 1.48749 | 70.24 | 0.0022 | OHARA S-FSL5 |
| 02 | 7.749 | 2.64 | | | | |
| 03 | 15.507 | 1.20 | 1.51633 | 64.06 | −0.0045 | OHARA L-BSL7 |
| 04* | 5.077 | 10.90 | | | | |
| 05 | 23.488 | 1.61 | 1.83400 | 37.16 | −0.0037 | OHARA S-LAH60 |
| 06 | −49.774 | 5.62 | | | | |
| 07 | APERTURE STOP | 3.20 | | | | |
| 08 | 71.630 | 2.01 | 1.49700 | 81.54 | 0.0280 | OHARA S-FPL51 |
| 09 | −8.151 | 1.00 | 1.69895 | 30.13 | 0.0103 | OHARA S-TIM35 |
| 10 | −25.309 | 0.20 | | | | |
| 11 | 20.224 | 1.00 | 1.64769 | 33.79 | 0.0070 | OHARA S-TIM22 |
| 12 | 9.811 | 2.30 | 1.49700 | 81.54 | 0.0280 | OHARA S-FPL51 |
| 13 | −18.713 | 4.34 | | | | |
| 14* | 16.584 | 1.46 | 1.51633 | 64.06 | −0.0045 | OHARA L-BSL7 |
| 15 | 97.102 | 6.91 | | | | |
| 16 | ∞ | 1.24 | 1.51680 | 64.20 | | Various type filter(s) |
| 17 | ∞ | | | | | |

In Table 6, an asterisk (*) indicates that the surface is aspheric.

That is, each of optical surfaces of a fourth surface and a 14th surface are aspheric and the parameters in the Equation for each aspheric surface are as follows.

Aspheric surface: the 4th surface $K=-0.83616, A_4=1.06538\times10^{-4}, A_6=-2.50034\times10^{-6},$
$A_8=9.83448\times10^{-9}, A_{10}=-1.85737\times10^{-9}$ Aspheric surface: the 14th surface $K=0.0, A_4=-2.40864\times10^{-4}, A_6=3.17695\times10^{-6}, A_8=-1.91600\times10^{-7}, A_{10}=2.94310\times10^{-9}$ Each of values according to the above*mentioned conditions $[L_{2F}/L], [f_A/f_1], [A_{1F-1R}/L_1]$ in this numerical Example 6 are as follows:

The values used in the above-mentioned conditions of the Example 6

$r_{S1}/f_A=-1.36$ $r_{S2}/f_A=1.63$ $L_{2F}/L=0.137$ $f_A/f_1=0.049$ $A_{1F-1R}/L_1=0.621$

Accordingly, the numerical values according to the above-mentioned conditions in the numerical Example 6 are within the conditions.

Figure 13:
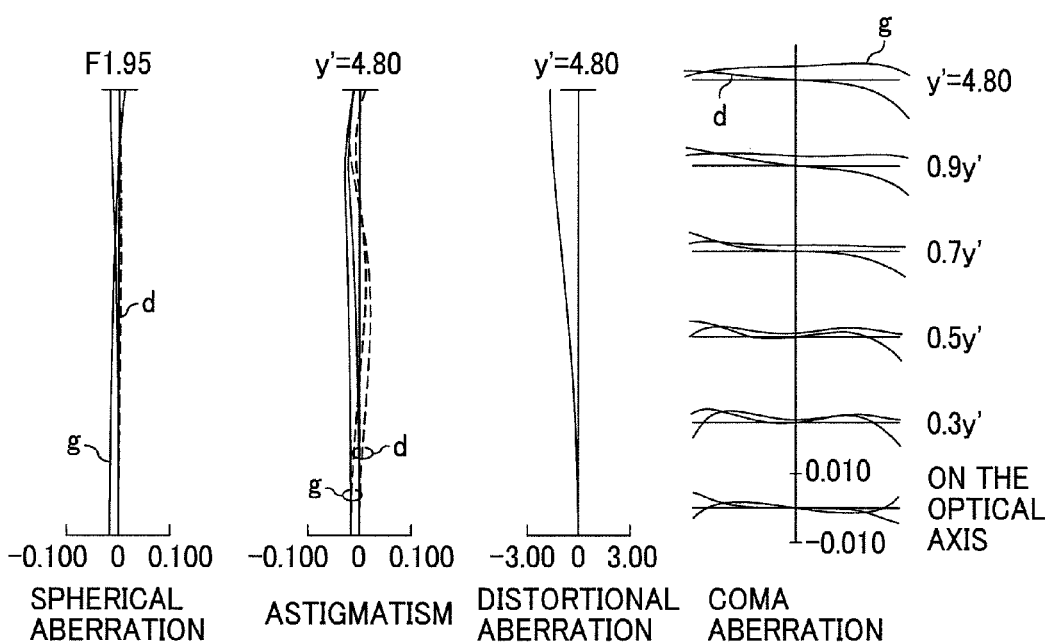
FIG. 13 is an aberration curve of an image forming lens of Numerical Example 6 according to the present invention.

FIG. 13 is a view illustrating an aberration curve illustrating the property of each of the aberrations of a spherical aberration, astigmatism, distortional aberration and coma aberration of the image forming lens L6 of the Numerical Example 6 according to the present invention shown in FIG. 6.

Among the aberration curves, the broken line in the spherical aberration curves indicates a sine condition, in astigmatism curves, the solid line indicates a sagittal image plane, and the broken line indicates a meridional image plane.

As can seen from FIG. 13, aberrations are sufficiently corrected or controlled as shown in FIG. 13 and thus spherical aberration and longitudinal chromatic aberration are small enough to be almost negligible. Further, Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens L6 according to the present invention, it is obvious from the Numerical Example 6 that, although it achieves a wide half angle of view of 38 degrees or so and a F value (number) around 2.00 or so, it is possible to ensure an extremely good image performance.

Figure 7:
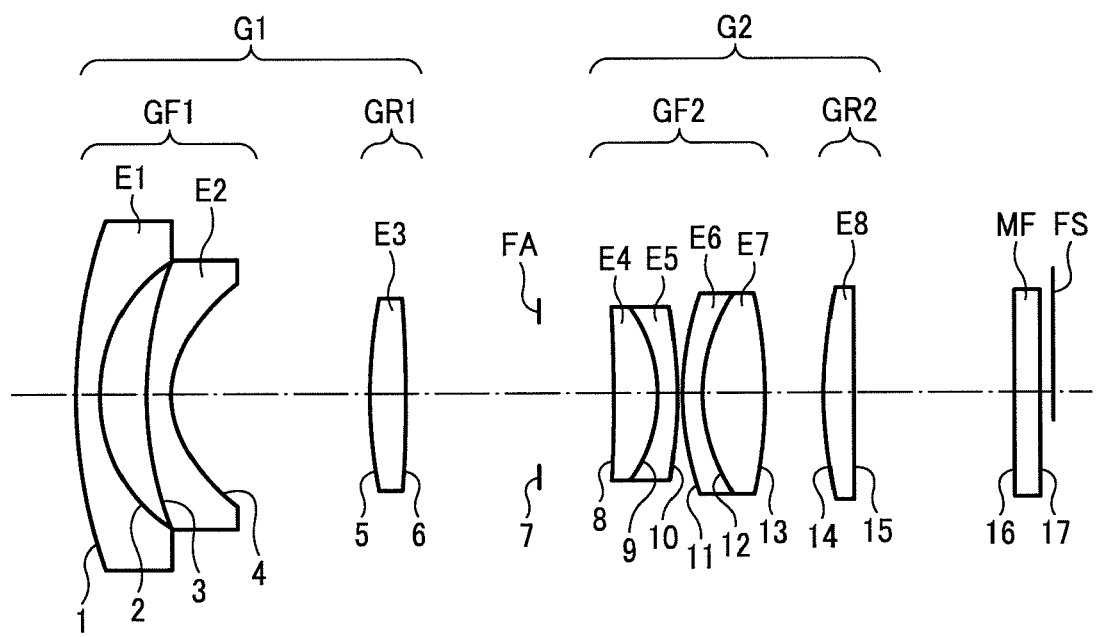
FIG. 7 is a sectional view illustrating an arrangement of an image forming lens of Numerical Example 7 according to the present invention.

FIG. 7 shows a configuration of an image forming lens according to Example 7 of the present invention (which corresponds to a seventh embodiment according to the present invention) and schematically shows a vertical section along an optical axis.

The optical system shown in FIG.7 comprises: from an object side to an image side in sequence, a first lens E1 of a negative meniscus lens having a convex surface facing the object side, a second lens E2 of a negative meniscus lens having a largely concave surface formed with an aspheric surface facing the image side, a third lens. E3 of a positive lens comprising a biconvex lens, an aperture stop FA, a cemented lens by firmly cementing a fourth lens E4 of a positive meniscus lens and a fifth lens E5 of a negative meniscus lens, a cemented lens by firmly cementing a sixth lens E6 of a negative meniscus lens and a seventh lens E7 of a positive lens comprising a biconvex lens, and an eighth lens E8 of a biconvex and positive lens having a largely convex surface facing the object side and formed with an aspheric surface.

The first lens E1, the second lens E2, and the third lens E3 constitute a first lens group G1. The fourth lens E4, the fifth lens E5, the sixth lens E6, the seventh lens E7, and the eighth lens E8 constitute a second lens group G2.

The first lens group comprises the first front lens group 1F, which is spaced by a most widest distance in the first lens group G1 including the first lens group E1 and the second lens E2 which are positioned in the object (front) side, and has a negative refractive power.

Further, the second lens group G2 comprises, from the object side in sequence, a front side second lens group GF2 in which the fourth lens E4 as a first positive lens, the fifth lens E5 as a first negative lens, the sixth lens E6 as a second negative lens, and the seventh lens E7 as a second positive lens are positioned. The eighth lens E8 constitutes a rear side second lens group GR2.

In the above-mentioned image forming lens L7, focusing to an object which is positioned in a predetermined distance from the front part of the camera is executed by moving the entire or a part of the second lens group G2.

In an image forming lens of cameras such as digital still cameras in each of which a solid-state image sensing device such as a CCD or the like is employed, any optical element of an optical low-pass filter, an infrared cut filter or the like, or a cover glass for protecting a light-receiving surface of a CCD image sensing device (hereinafter, referred as to "an optical filter MF"), is/are interposed between a final surface of the eight lens E8 and an image surface FS.

Meanwhile, in FIG. 7, each optical surface is numbered.

Furthermore, each reference number in FIG. 7 is commonly used in each of Examples to avoid cumbersome description in the drawings due to increased numbers of reference numbers.

For this reason, although the reference numbers common to those in FIG. 1 will be used for the different configurations of the image forming lens in each of the Examples, the configuration in FIG. 7 is not common to those in the remaining Examples.

Figure 14:
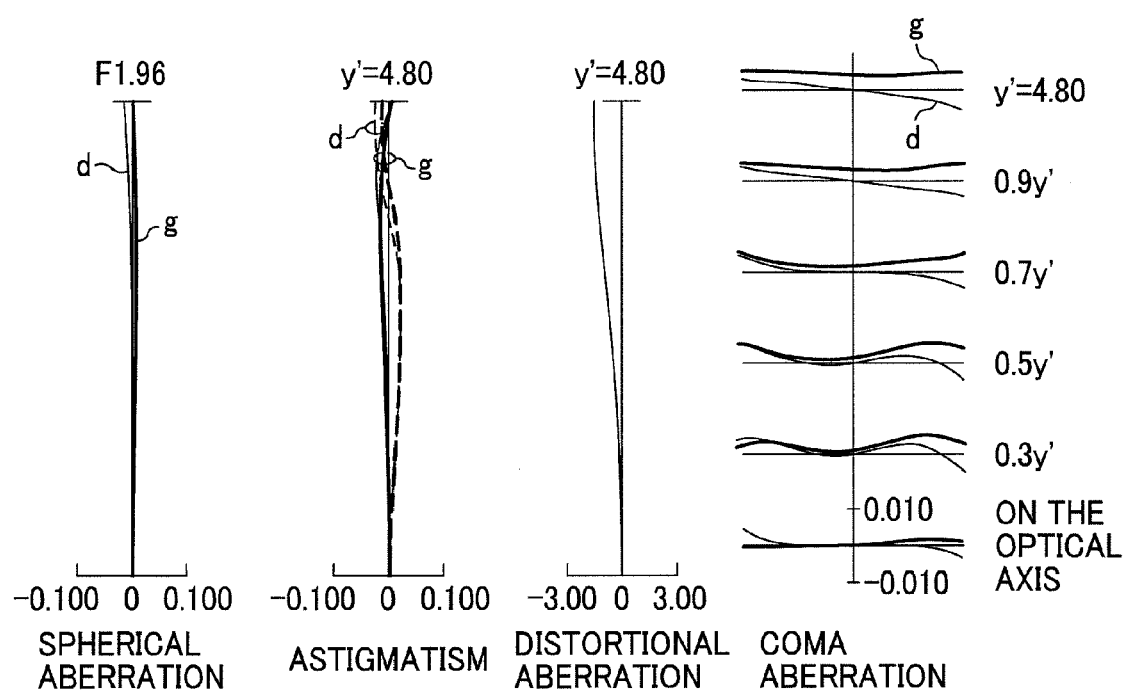
FIG. 14 is an aberration curve of an image forming lens of Numerical Example 7 according to the present invention.

Further, FIG. 14 is a view illustrating an aberration curve of a spherical aberration, astigmatism, distortion and coma aberration of the image forming lens of the Example 7 according to the present invention shown in FIG. 7.

In the Example 7, the focal length f=6.00, F value (number)=1.96, and the half angle of view ω=39.1 degrees. Optical properties of each optical element are shown in the following table.

TABLE 7

Numerical Example 7
f = 6.00, F = 1.96, α = 39.1

| Surface No. | R | D | $N_d$ | $v_d$ | $\Delta\theta_{g,F}$ | Glass |
|---|---|---|---|---|---|---|
| 01 | 24.733 | 1.20 | 1.49700 | 81.54 | 0.0280 | OHARA S-FPL51 |
| 02 | 7.000 | 2.17 | | | | |
| 03 | 16.500 | 1.22 | 1.51742 | 52.43 | −0.0002 | OHARA S-NSL36 |
| 04* | 4.799 | 9.50 | | | | |
| 05 | 15.939 | 1.91 | 1.70154 | 41.24 | 0.0018 | OHARA S-BAH27 |
| 06 | −43.327 | 6.39 | | | | |
| 07 | APERTURE | 3.50 | | | | |

TABLE 7-continued

Numerical Example 7
f = 6.00, F = 1.96, α = 39.1

| Surface No. | R | D | $N_d$ | $v_d$ | $\Delta\theta_{g,F}$ | Glass |
|---|---|---|---|---|---|---|
| | STOP | | | | | |
| 08 | −78.372 | 2.22 | 1.48749 | 70.24 | 0.0022 | OHARA S-FSL5 |
| 09 | −6.782 | 1.02 | 1.74000 | 28.30 | 0.0122 | OHARA S-TIH3 |
| 10 | −19.784 | 0.20 | | | | |
| 11 | 13.770 | 1.00 | 1.65412 | 39.68 | −0.0036 | OHARA S-NBH5 |
| 12 | 8.858 | 3.04 | 1.49700 | 81.54 | 0.0280 | OHARA S-FPL51 |
| 13 | −19.091 | 2.80 | | | | |
| 14* | 19.635 | 1.50 | 1.51633 | 64.06 | −0.0045 | OHARA L-BSL7 |
| 15 | −469.023 | 7.70 | | | | |
| 16 | ∞ | 1.24 | 1.51680 | 64.20 | | Various type filter(s) |
| 17 | ∞ | | | | | |

In Table 7, an asterisk (*) indicates that the surface is aspheric.

That is, each of optical surfaces of a fourth surface and 14th surface are aspheric and the parameters in the Equation for each aspheric surface are as follows.

Aspheric surface: the 4th surface $K=-0.82970, A_4=6.46605\times10^{-5}, A_6=-2.89248\times10^{-6},$
$A_8=1.03022\times10^{-8}, A_{10}=-1.71499\times10^{-9}$ Aspheric surface: the 14th surface $K=0.0, A_4=-2.57760\times10^{-4}, A_67=1.76756\times10^{-6}, A_8=-1.22031\times10^{-7}, A_{10}=1.59466\times10^{-9}$ Each of values according to the above-mentioned conditions in this Numerical Example 7 are as follows.

The values used in the above-mentioned conditions of the Example 7

$v_{dp1}=70.24$ $v_{dn1}=28.30$ $v_{dn2}=39.68$ $v_{dp2}=81.54$ $v_{dn1}-v_{dn2}=-11.38$ $r_{S1}/f_A=-1.13$ $r_{S2}/f_A=1.48$ $L_{2F}/L=0.158$ $f_A/f_1=0.073$ $A_{1F-1R}/L_1=0.594$

Accordingly, the numerical values according to the above-mentioned conditions in the Numerical Example 7 are within the conditions.

FIG. 14 is a view illustrating an aberration curve illustrating the property of each of the aberrations of a spherical aberration, astigmatism, distortional aberration and coma aberration of the image forming lens of the Numerical Example 7 according to the present invention shown in FIG. 7.

Among the aberration curves, the broken line in the spherical aberration curves indicates a sine condition, in astigmatism curves, the solid line indicates a sagittal image plane, and the broken line indicates a meridional image plane.

According to the image forming lens L7 which is arranged as shown in FIG. 7 of the above-mentioned Numerical Example 7 according to the present invention, aberrations therein are sufficiently corrected or controlled as shown in FIG. 14 and thus spherical aberration and longitudinal chromatic aberration are small enough to be almost negligible.

Astigmatism, curvature of field and chromatic aberration of magnification are sufficiently small and Coma and color difference thereof are sufficiently corrected or controlled up to the most peripheral portion thereof. Accordingly, distortional aberration is suppressed less than 2.0%.

With the arrangement of the image forming lens according to the present invention, it is obvious from the Numerical Example 7 that, although it achieves a wide half angle of view of 39 degrees or so and a F value (number) around 2.00 or so, it is possible to ensure an extremely good image performance.

Next, referring to FIGS. 15A and 15B, FIG. 16, and FIG. 17, Example 8 (which corresponds to a eighth embodiment according to the present invention) in which the camera is constituted by employing the image forming lens L1 to L7 according to the present invention as shown in Examples 1 to 7 as a photographic optical system will be described.

Such a mobile information terminal is different in external appearance to a certain extent but includes almost the same functions and constitutions therein. Thus, such a mobile information terminal may utilize the image forming lens according to the present invention.

Figure 15A:
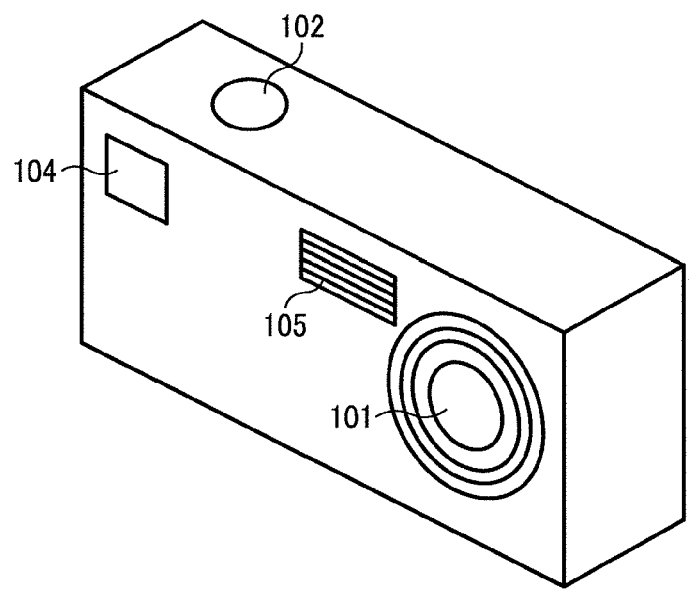
FIG. 15A is a perspective view of an external structure of a camera of Numerical Example 8 according to the present invention, illustrating the photographing lens being collapsed into a body of the camera.
Figure 15B:
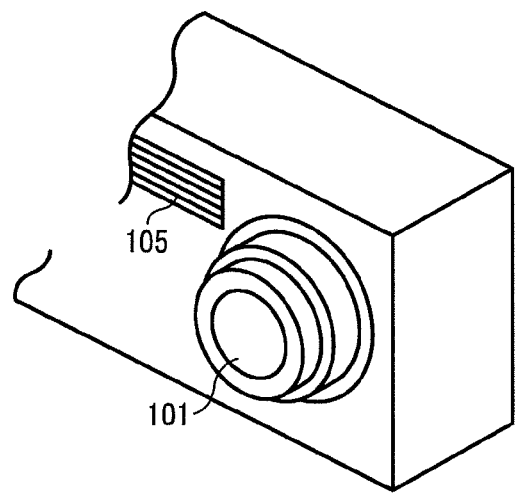
FIG. 15B is a perspective view illustrating the photographing lens protruded from the body of the camera.
Figure 16:
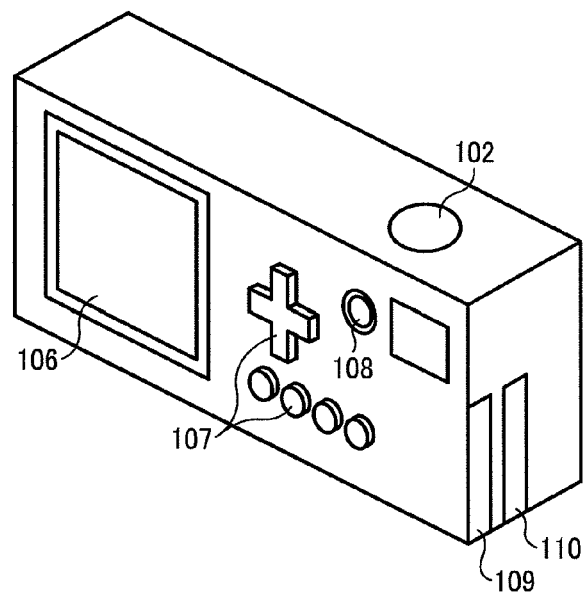
FIG. 16 is a schematic perspective view of the external appearance of the camera in FIG. 15A and FIG. 15B viewed from the photographer or behind.
Figure 17:
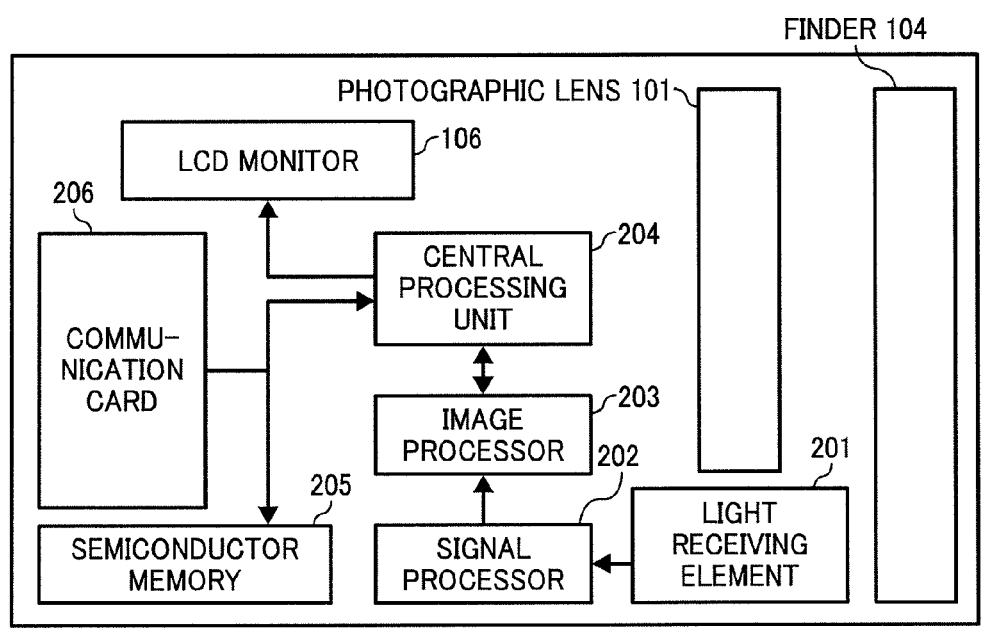
FIG. 17 is a schematic block diagram of functional features of the camera in FIG. 15A and FIG. 15B.

As shown in FIGS. 15A and FIG. 15B, and FIG. 16, the camera includes a photographing lens unit 101, a shutter release button 102, an optical viewfinder 104, a stroboscope 105, a liquid crystal monitor 106, an operation button 107, a power supply switch 108, a memory card 109, and a communication card slot 110, and so on.

Further, the camera includes a light-receiving element 201, a signal processing unit 202, an image processing unit 203, a central processing unit (CPU) 204, a semiconductor memory 205, and a communication card 206.

The camera includes the photographing lens unit 101, and a light-receiving element 201 (not shown) as an area sensor such as a CCD (Charge Coupled Device) image pickup element or the like. The camera is thus structured to carry out image-forming of an image of an object to be photographed, that is, of an photographic object, by the photographic lens unit 101 as the photographic optical system, and to read the formed image by the light-receiving element. The image forming lens according to the present invention, described in Example 1 to 7 (the first to the seventh embodiment) above, is utilized for the photographic lens unit 101.

An output from the light-receiving element 201 is processed by a signal processor 202, which is controlled by a central processing unit (CPU) 204, and is converted into digital image information.

The image information digitized by the signal processor 202 is subjected to a predetermined image processing in an image processor 203 which is also controlled by the central processing unit 204, and then stored in a semiconductor memory 206 such as non-volatile memory.

In this case, the semiconductor memory 205 may be a memory card inserted in a memory card slot 109, or may be a semiconductor memory integrated in a body of the camera.

The Liquid crystal monitor 106 may display an image while the photographing is being carried out, or may display an image stored in the semiconductor memory 205.

The image stored in the semiconductor memory 205 is possible to be transmitted to outside of the camera via a communication card and the like 206 inserted in a communication card slot 110.

The photographic lens unit 101 is in a collapsed state and embedded within the camera body when the camera is being transported or carried as shown in FIG. 15A. When the user operates the main switch 108 to turn on the power, a lens barrel is extended and projected out from the camera body as shown in FIG. 15B.

In many cases, the focusing, i.e. bringing the photographic object into focus, is achieved by half-pressing operation of the shutter release button 102. Although the focusing in the image forming lenses as shown in Examples 1 to 7 mentioned above is achieved by moving the entire or a part of the second lens group G2, it is also achieved by the movement of the light-receiving element 201. When the shutter release button 102 is further pressed to a completely pressed state, the photographing is carried out, and subsequently the process as described above is performed.

According to one embodiment of an image forming lens according to the present invention, the following conditions (1) and (2) are satisfied.

$$-2.4 < r_{S1}/f_A < -0.8 \quad (1)$$

$$1.0 r_{S2}/f_A < 2.6 \quad (2)$$

According to another embodiment of an image forming lens according to the present invention, the following condition (3) is satisfied.

$$0.0 < f_A/f_1 < 0.8 \quad (3)$$

According to another embodiment of an image forming lens according to the present invention, the following condition (4) is satisfied.

$$0.1 < L_{2F}/L < 0.25 \quad (4)$$

According to another embodiment of an image forming lens according to the present invention, the following condition (5) is satisfied.

$$0.35 < A_{1F-1R}/L_1 < 0.7 \quad (5)$$

According to another embodiment of an image forming lens according to the present invention, the following conditions (6) and (7) are satisfied.

$$v_d > 80.0 \quad (6)$$

$$\Delta\theta_{g,F} > 0.025 \quad (7)$$

According to another embodiment of an image forming lens according to the present invention, the occurrence of aberration is further effectively suppressed and, in particular, distortional aberration is sufficiently corrected and controlled.

According to another embodiment of an image forming lens according to the present invention, comatic aberration is farther sufficiently corrected and controlled without a complicated structure than needed.

According to another embodiment of an image forming lens according to the present invention, it is most preferable in that focusing onto an object at a predetermined distance is executed by moving the entire or a part of the second F lens group.

According to another embodiment of an image forming lens according to the present invention, it is possible to provide an image forming lens in which each aberration is sufficiently corrected and controlled.

According to another embodiment of an image forming lens according to the present invention, it is possible to provide an image forming lens in which the substantial manufacture error is reduced and thus a stable performance is easy to obtain.

According to another embodiment of an image forming lens according to the present invention, it is possible to correct and control chromatic aberration in a well balanced manner while the conditions (1) and (2) are satisfied and monochromatic aberration is suppressed to be low.

According to embodiments of an image forming lens according to the present invention, a high performance image forming lens which achieves a wide half angle of view, an large aperture, a relative compactness, sufficiently corrected and controlled aberrations, high resolving power, high contrast, no necessary color attachment, and provision of a vivid depiction of a straight line as a straight line without distortion.

According to another embodiment of an image forming lens according to the present invention, a camera capable of realizing a vivid image depiction without dispersion or a portable information terminal is realized by employing such an image forming lens having a high performance.

According to another embodiment of an image forming lens according to the present invention, it is possible to provide an image forming lens in which a flatness of the image surface and the like are improved.

Accordingly, a camera having a further higher image quality or a portable information terminal employing an image forming lens having such a high performance which has a high resolution over the entire image from the releasing and opening the aperture stop is realized.

According to another embodiment of an image forming lens according to the present invention, it is possible to provide an image forming lens having a further high performance in which a flatness of the image surface and the like are improved.

Accordingly, a camera having a further higher image quality or a portable information terminal employing an image forming lens having such a high performance which has a high resolution over the entire image from the releasing and opening the aperture stop is realized.

According to another embodiment of an image forming lens according to the present invention, it is possible to provide an image forming lens having a further high performance in which the occurrence of spherical aberration accompanied with realizing a large aperture is suppressed.

Accordingly, a camera having a further higher image quality or a portable information terminal employing an image forming lens having such a high performance which is capable of realizing a high vivid depiction from the releasing and opening the aperture stop is realized.

According to another embodiment of an image forming lens according to the present invention, $v_d$ is defined as being Abbe's number of the first positive lens of the second lens group (G2), $\Delta\theta_{g,F}$ defined as being abnormal dispersion of the first positive lens. Abbe's number $v_d$ is depicted in the abscissa. The partial dispersion ratio $\theta_{g,F}=(n_g-n_F)/(n_F-n_C)$ is depicted in the vertical axis. The standard line is a line which connects the peculiar points of the glass K7 (Ohara Co., Ltd.:NSL7) and the peculiar points of the glass F2 (Ohara Co., Ltd.:PBM2) ($n_g$, $n_F$, and $n_C$ are defined as refractive indices with respect to g-line, f-line, and c-line). The abnormal dispersion $\Delta\theta_{g,F}$ is shown as an offset from a standard line of the glass in question when the standard line is regarded as a line which connects the peculiar points of the glass K7 and the peculiar points of the glass F2. It is possible to provide an image forming lens having a further higher performance in which chromatic aberration is further sufficiently corrected and controlled.

Accordingly a camera having a high image quality or a portable information terminal employing an image forming lens having such a further higher performance in which color shift and color blotting are practically not worried about.

According to another embodiment of an image forming lens according to the present invention, it is possible to provide an image forming lens in which the occurrence of aberration is further effectively suppressed and, in particular, distortional aberration is sufficiently corrected and controlled.

Accordingly, a camera having a further higher image quality or a portable information terminal employing an image forming lens having such a further higher performance in which a building and the like are photographed without feeling a distortion thereof is realized.

According to another embodiment of an image forming lens according to the present invention, it is possible to provide an image forming lens in which comatic aberration is further sufficiently corrected and controlled without a complicated structure than needed.

Accordingly, a camera having a further higher image quality or a portable information terminal employing an image forming lens having such a further higher performance in which there are no point spread collapse up to the periphery of angle of view, is realized.

According to another embodiment of an image forming lens according to the present invention, it is possible to provide a proper method in which focusing onto an object at a predetermined distance is executed.

Accordingly, it is possible to realize a compactness of a focus mechanism and thus a camera having a high image quality or a portable information terminal employing such a proper method is realized.

According to another embodiment of an image forming lens according to the present invention, since the first forward lens group (GF1) having a negative refractive power is arranged in the object side and then the first rear lens group (GRl) having a positive refractive power is arranged in the image side, in order, it is possible to achieve a good balance between securing a sufficient field angle of view and correcting various type aberrations such as a spherical aberration.

Although the preferred embodiment of the present invention have been described, it should be noted that the present invention is not limited to those embodiments, various modifications and changes can be made to the embodiments.

What is claimed is:

1. An image forming lens consisting of:
a first optical system positioned in an object side, a second optical system positioned in an image side, and an aperture stop interposed between the first optical system and the second optical system,
wherein the first optical system consists of a first F lens group which is positioned in the object side and has at least two negative lenses, and a first R lens group which is positioned on the aperture stop side and has at least one positive lens,
wherein a distance between the first F lens group and the first R lens group is set to be largest in the first optical system, and
wherein the second optical system consists of a second F lens group in which, in the order from the aperture stop side, a first positive lens, a first negative lens, a second negative lens, and a second positive lens are arranged, and a second R lens group positioned in the image side and having at least one lens.

2. The image forming lens as claimed in claim 1,
wherein the first F lens group has a negative refractive power, the first R lens group has a positive refractive power, the second optical system generally has a positive refractive power, and the second F lens group has a positive refractive power.

3. An image forming lens as claimed in claim 1, wherein the following conditional equations are satisfied:

$$62.0 < v_{dp1} < 98.0$$

$$20.0 < v_{dn1} < 45.0$$

$$20.0 < v_{dn2} < 45.0$$

$$35.0 < v_{dp2} < 98.0$$

$$-20.0 < v_{dn1} - v_{dn2} < 15.0$$

wherein $v_{dp1}$ is Abbe's number of the first positive lens of the second F lens group, $v_{dn1}$ is Abbe's number of the first negative lens, $v_{dn2}$ is Abbe's number of the second negative lens, and $v_{dp2}$ is Abbe's number of the second positive lens.

4. An image forming lens as claimed in claim 2, wherein the following conditional equations are satisfied:

$$62.0 < v_{dp1} < 98.0$$

$$20.0 < v_{dn1} < 45.0$$

$$20.0 < v_{dn2} < 45.0$$

$$35.0 < v_{dp2} < 98.0$$

$$-20.0 < v_{dp1} - v_{dp2} < 15.0$$

wherein $v_{dp1}$ is Abbe's number of the first positive lens of the second F lens group, $v_{dn1}$ is Abbe's number of the first negative lens, $v_{dn2}$ is Abbe's number of the second negative lens, and $v_{dp2}$ is Abbe's number of the second positive lens.

5. The image forming lens as claimed in claim 1,
wherein the following condition is satisfied:

$$0.1 < L_{2F}/L < 0.25$$

where $L_{2F}$ is an entire length of the second F lens group, and L is a distance from the most object side surface of the image forming lens to the image forming surface.

6. The image forming lens as claimed in claim 1,
wherein the first positive lens and the first negative lens of the second F lens group, and the second negative lens and the second positive lens of the same are cemented, respectively.

7. The image forming lens as claimed in claim 6, wherein a cemented surface of the first positive lens and the first negative lens of the second F lens group is convex in an image side, while a cemented surface of the second negative lens and the second positive lens is convex in an object side.

8. The image forming lens as claimed in claim 7, wherein the following conditional equations are satisfied:

$$-2.4 < r_{S1}/f_A < -0.8$$

$$1.0 < r_{S2}/f_A < 2.6$$

where $r_{S1}$ is a radius of curvature of the cemented surface of the first positive lens and the first negative lens, $r_{S2}$ is a radius of curvature of the cemented surface of the second negative lens and the second positive lens, and $f_A$ is a focal length of the entire optical system.

9. The image forming lens as claimed in claim 1, wherein the following conditional equation is satisfied:

$$0.0 < f_A/f_1 < 0.8$$

where $f_A$ is a focal length of the entire optical system, and $f_1$ is a focal length of the first optical system.

10. The image forming lens as claimed in claim 1, wherein the following conditional equation is satisfied:

$$0.35 < A_{1F-1R}/L_1 < 0.7$$

where $A_{1F-1R}$ is an interval between the first F lens group and the first R lens group, and $L_1$ is an entire length of the first optical system.

11. The image forming lens as claimed in claim 1, wherein the following conditional equations are satisfied:

$$v_d > 80.0$$

$$\Delta\theta_{g,F} > 0.025$$

where $v_d$ is Abbe's number of the first positive lens of the second F lens group of the second optical system, and 66 $\theta_{g,F}$ are abnormal dispersity.

12. The image forming lens as claimed in claim 1, wherein the first F lens group has a structure in which two meniscus negative lenses facing their convex surfaces toward an object side are arranged in series, and at least an image side surface of either lens is aspheric.

13. The image forming lens as claimed in claim 1, wherein the second R lens group consists of a single lens and the single lens has an aspheric surface.

14. The image forming lens as claimed in claim 1, wherein focusing onto an object positioned at a predetermined distance from a front surface of a camera is performed by moving the entire or a part of the second optical system.

15. A camera comprising an image forming lens as claimed in claim 1 as a photographing optical system.

16. A portable information terminal comprising an image forming lens as claimed in claim 1 as photographing optical system used in a camera function unit.

17. An image forming lens consisting of:
a first optical system positioned in an object side, a second optical system positioned in an image side, and an aperture stop interposed between the first optical system and the second optical system,
wherein the first optical system consists of a first F lens group which is positioned in the object side and has a negative refractive power, and a first R lens group which is positioned on the aperture stop side and has a positive refractive power,
wherein a distance between the first F lens group and the first R lens group is set to be largest in the first optical system,
wherein the second optical system has a positive refractive power and consists of a second F lens group in which, in the order from the aperture stop side, a first positive lens, a first negative lens, a second negative lens, and a second positive lens are arranged, the second F lens group having a positive refractive power, and a second R lens group having a lens,
wherein the first positive lens and the first negative lens of the second F lens group, and the second negative lens and the second positive lens of the same are cemented, respectively, and
wherein the following conditional equations are satisfied:

$$-2.4 < r_{S1}/f_A < -0.8$$

$$1.0 < r_{S2}/f_A < 2.6$$

where $r_{S1}$ is a radius of curvature of the cemented surface of the first positive lens and the first negative lens, $r_{S2}$ is a radius of curvature of the cemented surface of the second negative lens and the second positive lens, and $f_A$ is a focal length of the entire optical system.

18. An image forming lens consisting of:
a first optical system positioned in an object side, a second optical system positioned in an image side, and an aperture stop interposed between the first optical system and the second optical system,
wherein the first lens system consists of a first F lens group which is positioned in the object side and has a negative refractive power, and a first R lens group which is positioned on the aperture stop side and has a positive refractive power,
wherein a distance between the first F lens group and the first R lens group is set to be largest in the first optical system,
wherein the second optical system consists of a second F lens group in which, in the order from the object side, a first positive lens, a first negative lens, a second negative lens, and a second positive lens are sequentially arranged, and a second R lens group having at least one lens, and
wherein the following conditional equations are satisfied:

$$62.0 < v_{dp1} < 98.0$$

$$20.0 < v_{dn1} < 45.0$$

$$20.0 < v_{dn2} < 45.0$$

$$35.0 < v_{dp2} < 98.0$$

$$-20.0 < v_{dn1} - v_{dn2} < 15.0$$

wherein $v_{dp1}$ is Abbe's number of the first positive lens of the second F lens group, $v_{dn1}$ is Abbe's number of the first negative lens, $v_{dn2}$ is Abbe's number of the second negative lens, and $v_{dp2}$ is Abbe's number of the second positive lens.

* * * * *